US012518401B2

(12) United States Patent
Tsuji et al.

(10) Patent No.: US 12,518,401 B2
(45) Date of Patent: Jan. 6, 2026

(54) IMAGE PROCESSING APPARATUS, IMAGING APPARATUS, CONTROL METHOD, AND STORAGE MEDIUM FOR PERFORMING DETECTION OF SUBJECT

(71) Applicant: CANON KABUSHIKI KAISHA, Tokyo (JP)

(72) Inventors: Ryosuke Tsuji, Kanagawa (JP); Kanako Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 18/189,578

(22) Filed: Mar. 24, 2023

(65) Prior Publication Data

US 2023/0316542 A1    Oct. 5, 2023

(30) Foreign Application Priority Data

Mar. 28, 2022    (JP) ................................ 2022-051873

(51) Int. Cl.
*G06T 7/246* (2017.01)
*G06V 10/26* (2022.01)
*G06V 40/10* (2022.01)

(52) U.S. Cl.
CPC ............ *G06T 7/246* (2017.01); *G06V 10/267* (2022.01); *G06T 2207/20081* (2013.01); *G06T 2207/20084* (2013.01); *G06T 2207/30196* (2013.01); *G06V 40/10* (2022.01); *G06V 2201/08* (2022.01)

(58) Field of Classification Search
None
See application file for complete search history.

(56) References Cited

U.S. PATENT DOCUMENTS

| 11,423,265 | B1* | 8/2022 | Chen ................... G06T 11/00 |
| 11,750,912 | B2* | 9/2023 | Wada ................... G06T 7/248 |
| | | | 348/169 |
| 12,142,019 | B2* | 11/2024 | Tsuji ................... G06V 20/60 |
| 2008/0193115 | A1* | 8/2008 | Uenishi ................ G03B 13/36 |
| | | | 348/E5.045 |
| 2016/0309089 | A1* | 10/2016 | Hongu ................ H04N 23/61 |
| 2017/0104938 | A1* | 4/2017 | Shimosato ........... H04N 23/61 |
| 2018/0373943 | A1* | 12/2018 | Tanigawa ............ G06V 10/25 |

(Continued)

FOREIGN PATENT DOCUMENTS

| JP | 2008197153 A | 8/2008 |
| JP | 2016206352 A | 12/2016 |

(Continued)

*Primary Examiner* — Delomia L Gilliard
(74) *Attorney, Agent, or Firm* — Canon U.S.A., Inc. IP Division

(57) ABSTRACT

An image processing apparatus acquires image data, detects a first area of a subject from image data, detects a second area of a subject from image data, and tracks the subject, wherein, when the first area is being detected from first image data, detection of the second area is performed in an area corresponding to the first area, and, in a case where the first area is detected in the first image data and the first area is not detected in second image data captured after the first image data, detection of the second area is performed in an area broader than the first area detected in the first image data, and wherein tracking of the subject is performed with use of at least one of detection results obtained in the first area and the second area.

37 Claims, 12 Drawing Sheets

(56) References Cited

U.S. PATENT DOCUMENTS

| | | | | |
|---|---|---|---|---|
| 2021/0104047 A1* | 4/2021 | Kamo | .................... | G06T 3/04 |
| 2021/0366131 A1* | 11/2021 | Matsuda | ................ | H04N 23/60 |
| 2022/0060635 A1* | 2/2022 | Sato | .................... | G06V 40/10 |
| 2022/0277537 A1* | 9/2022 | Tsuji | .................... | G06V 10/74 |
| 2022/0321782 A1* | 10/2022 | Hongu | ................ | H04N 23/633 |

FOREIGN PATENT DOCUMENTS

| | | | |
|---|---|---|---|
| JP | 2020197795 A | | 12/2020 |
| JP | 2021184564 A | | 12/2021 |
| WO | 2020137602 A1 | | 7/2020 |

* cited by examiner t-2 t-1 t

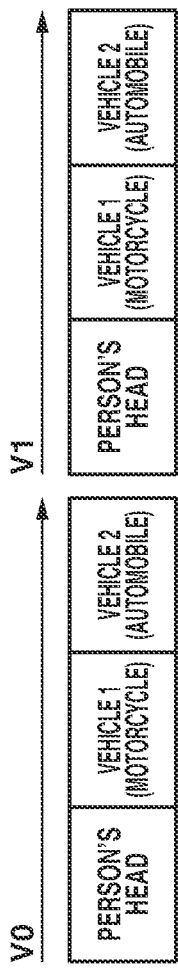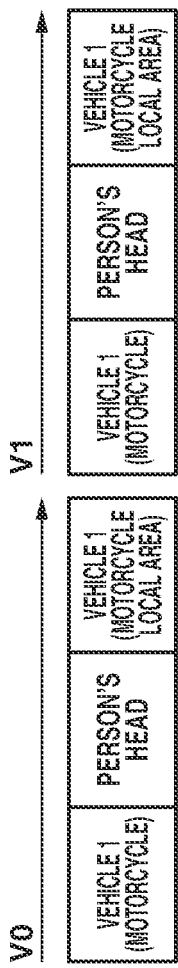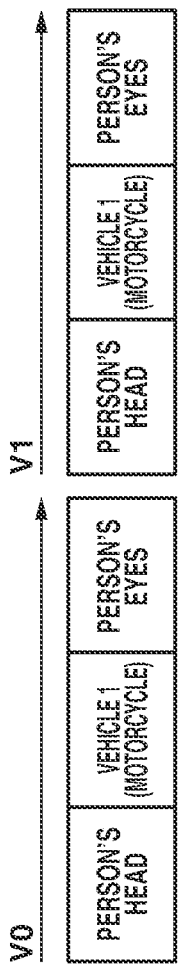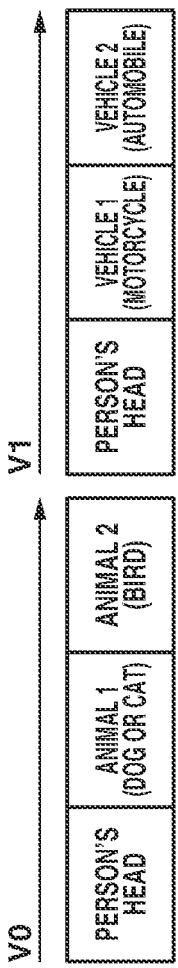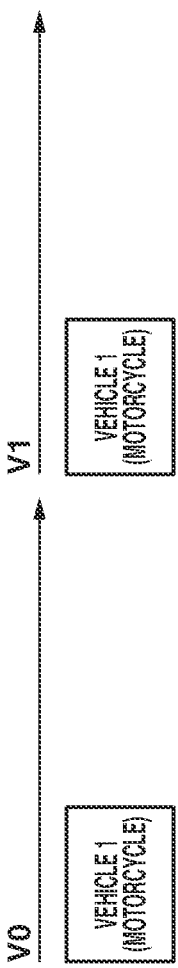

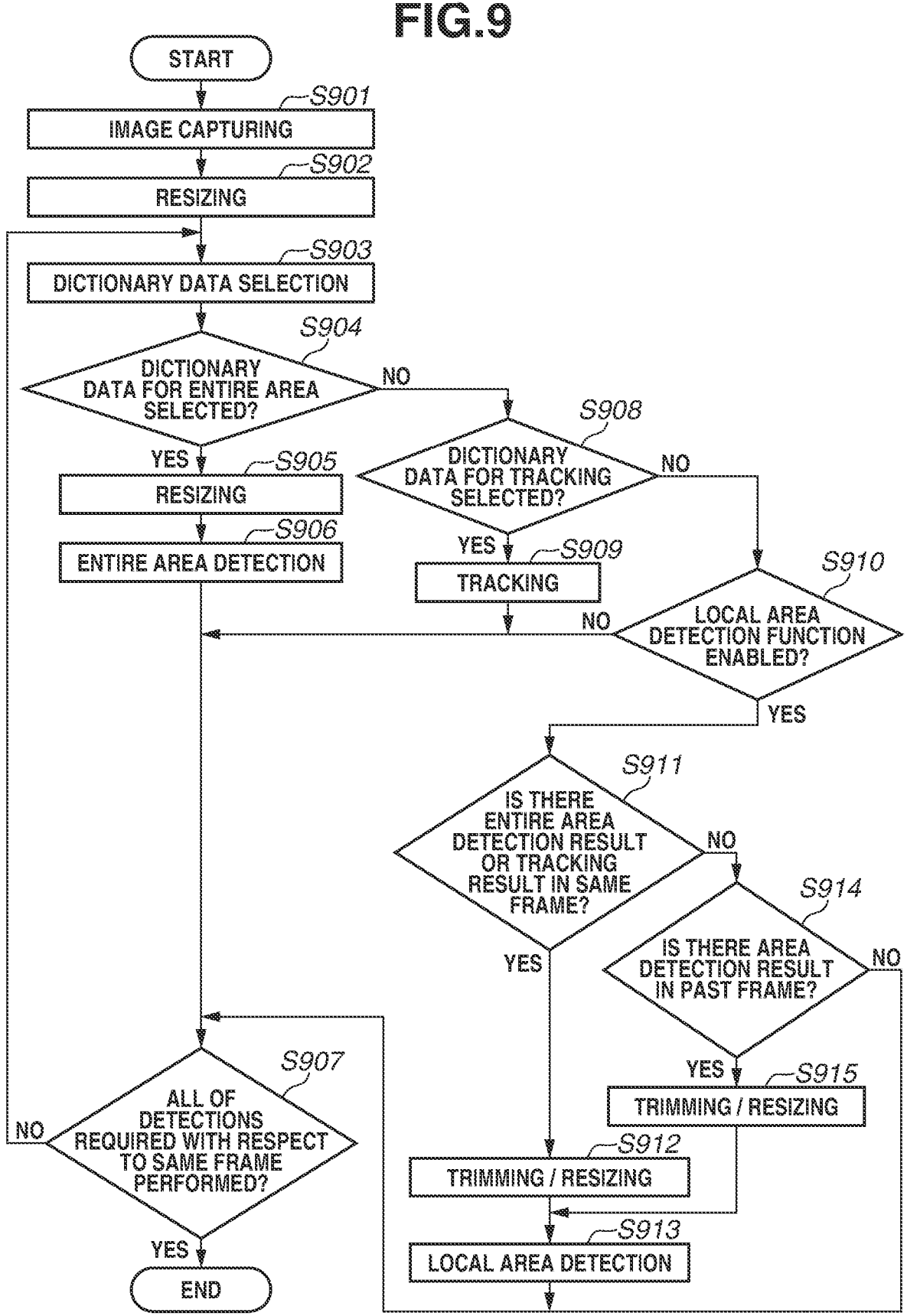

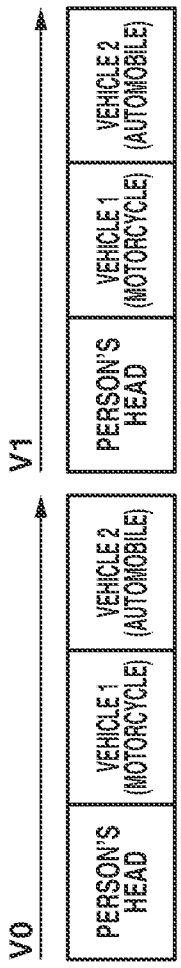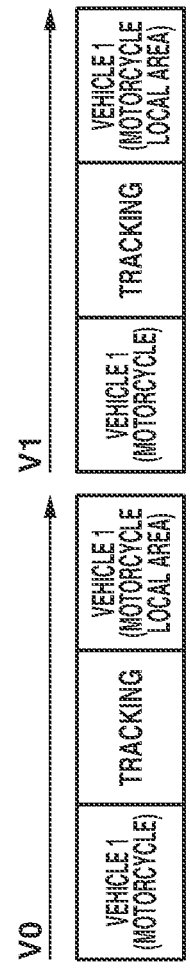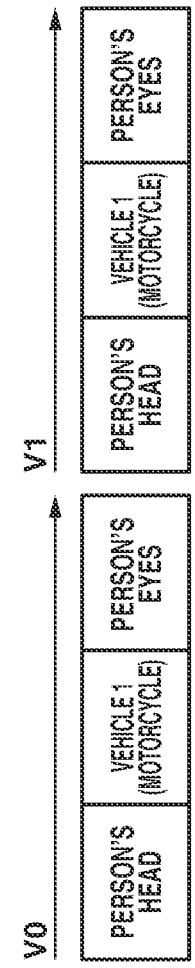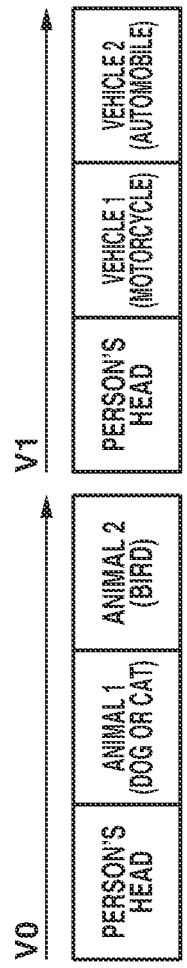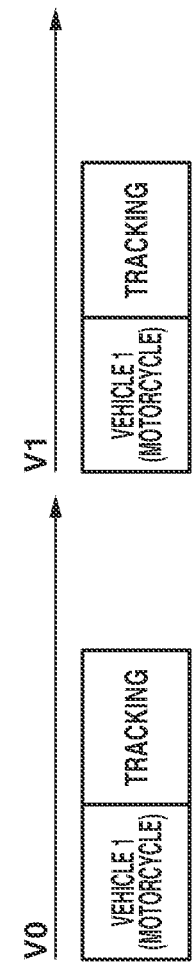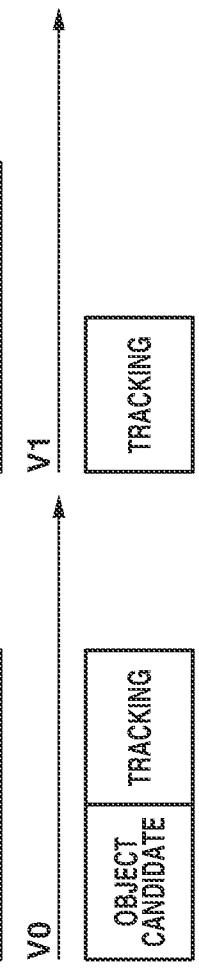

IMAGE PROCESSING APPARATUS, IMAGING APPARATUS, CONTROL METHOD, AND STORAGE MEDIUM FOR PERFORMING DETECTION OF SUBJECT

BACKGROUND OF THE DISCLOSURE

Field of the Disclosure

Aspects of the present disclosure generally relate to an image processing apparatus, an imaging apparatus, a control method, and a storage medium, each of which is capable of performing subject detection processing for detecting a specific subject.

Description of the Related Art

There is a technique of performing image processing for subject detection based on a learned model (trained model) which has performed machine learning for detecting a specific subject from image data captured by an imaging apparatus such as a digital camera.

The technique such as that discussed in Japanese Patent Application Laid-Open No. 2020-197795 automatically detects a specific area of a subject and then, with respect to the specific area, detects a narrower area included in the specific area, thus being able to detect a local area of the specific subject.

However, in the technique discussed in Japanese Patent Application Laid-Open No. 2020-197795, unless the entire area of a specific subject has been detected, it is difficult to detect a local area thereof.

SUMMARY OF THE DISCLOSURE

According to an aspect of the present disclosure, an image processing apparatus includes at least one processor and memory storing a program which causes the processor to function as an acquisition unit configured to acquire image data, a first detection unit configured to detect a first area of a subject from image data, a second detection unit configured to detect a second area of a subject from image data, and a tracking unit configured to track the subject, wherein, when the first detection unit is detecting the first area from first image data, the second detection unit performs detection of the second area in an area corresponding to the first area, and, in a case where the first area is detected in the first image data and the first area is not detected in second image data captured after the first image data, the second detection unit performs detection of the second area in an area broader than the first area detected in the first image data, and wherein the tracking unit performs tracking of the subject with use of at least one of detection results obtained by the first detection unit and the second detection unit.

Further features of the present disclosure will become apparent from the following description of exemplary embodiments with reference to the attached drawings.

BRIEF DESCRIPTION OF THE DRAWINGS

FIGS. 8A, 8B, 8C, 8D, and 8E are diagrams each illustrating an example of a switching sequence for a plurality of pieces of dictionary data with respect to one frame.

FIG. 9 is a flowchart illustrating the flow of processing obtained by adding tracking processing to the processing which is performed in an exemplary embodiment of the present disclosure.

FIGS. 11A, 11B, 11C, 11D, 11E, and 11F are diagrams illustrating an example of a sequence obtained by adding tracking to the switching sequence for a plurality of pieces of dictionary data.

DESCRIPTION OF THE EMBODIMENTS

Various exemplary embodiments, features, and aspects of the present disclosure will be described in detail below with reference to the drawings.

Figure 1A:
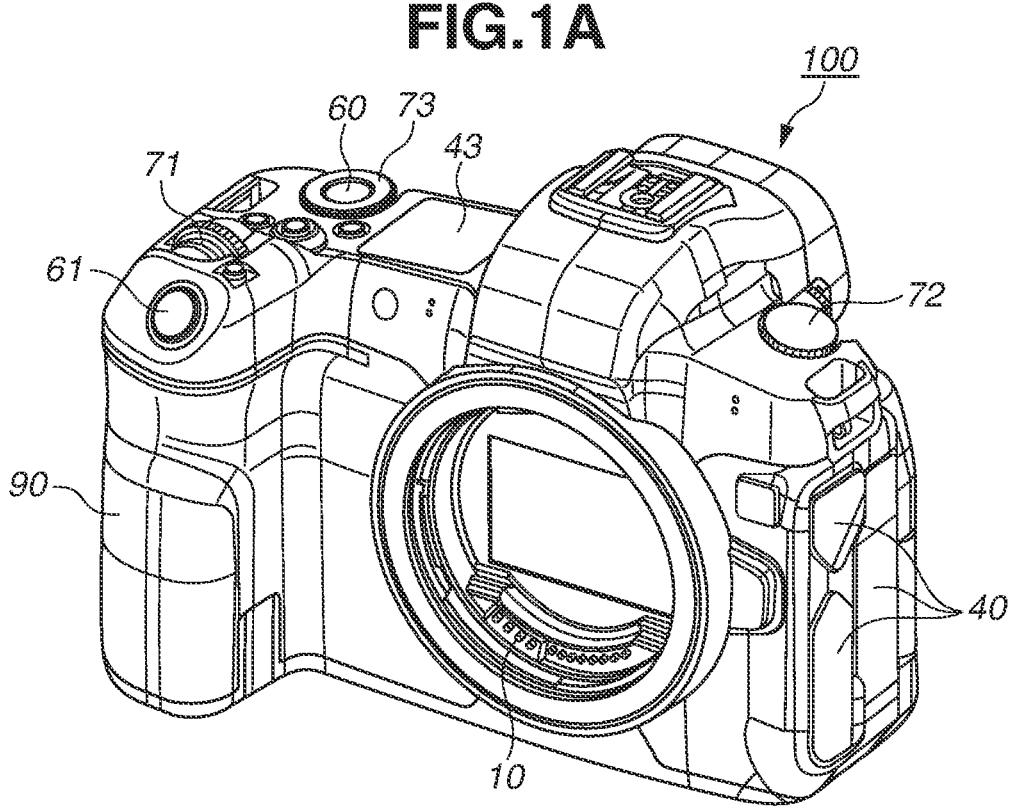
FIGS. 1A and 1B are appearance diagrams of an imaging apparatus.
Figure 1B:
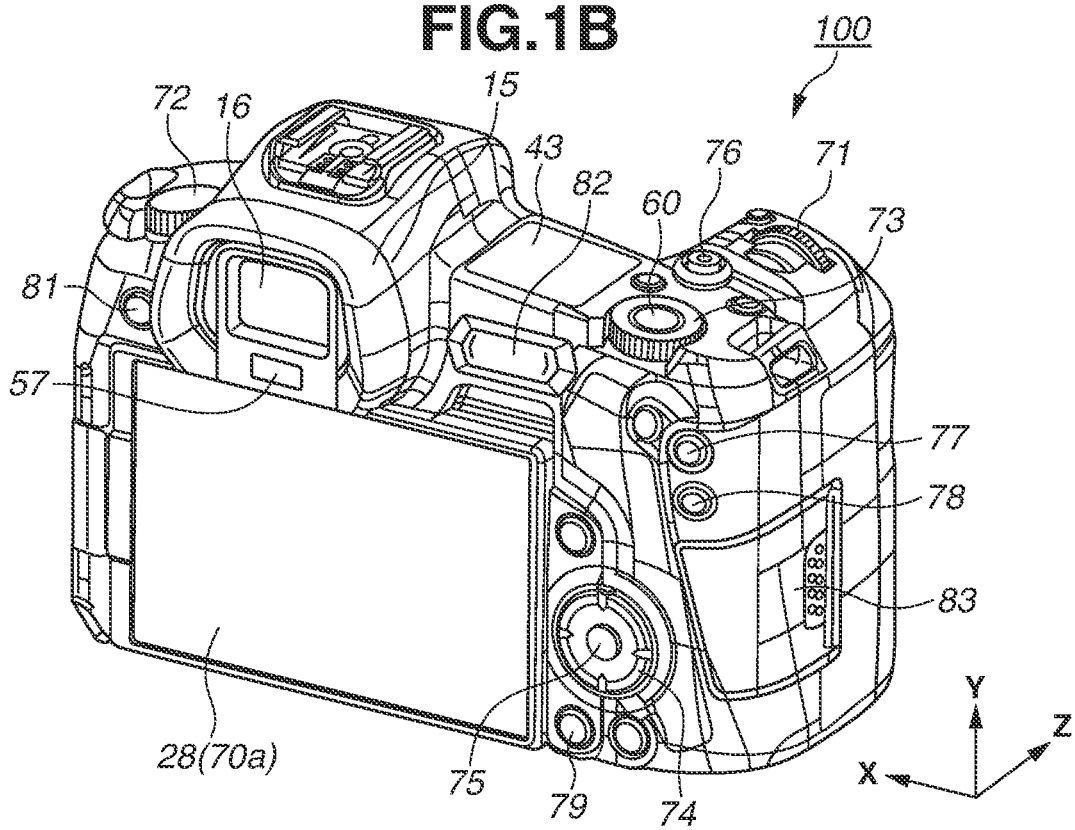

FIGS. 1A and 1B are appearance diagrams of an imaging apparatus 100, which is an example of an apparatus to which an exemplary embodiment of the present disclosure is applicable. FIG. 1A is a front surface perspective view of the imaging apparatus 100, and FIG. 1B is a back surface perspective view of the imaging apparatus 100.

Referring to FIGS. 1A and 1B, a display unit 28 is a display unit mounted on the back surface of the imaging apparatus 100, which displays an image or various pieces of information. A touch panel 70a is capable of detecting a touch operation performed on a display surface (operation surface) of the display unit 28. An extra-viewfinder display unit 43 is a display unit mounted on the top surface of the imaging apparatus 100, on which various setting values of the imaging apparatus 100 including, for example, a shutter speed and an aperture value are displayed. A shutter button 61 is an operation unit which is usable to issue an image capturing instruction. A mode selection switch 60 is an operation unit which is usable to switch between various modes. A terminal cover 40 is a cover which protects connectors (not illustrated) of, for example, a connection cable which connects an external device and the imaging apparatus 100.

A main electronic dial 71 is a rotational operation member included in an operation unit 70 (FIG. 2), so that the main electronic dial 71 can be rotated by the user to perform, for example, changing of setting values such as a shutter speed and an aperture value. A power switch 72 is an operation member which is usable to switch between turning-on and turning-off of the power source of the imaging apparatus 100. A sub-electronic dial 73 is a rotational operation member included in the operation unit 70, which is usable to perform, for example, movement of a selection frame or image advance. Arrow keys 74, which are included in the operation unit 70, are arrow keys (four-way keys) in which upper, lower, left, and right arrow portions thereof are able to be pressed. An operation corresponding to a pressed arrow portion of the arrow keys 74 is able to be performed. A SET button 75 is a push button included in the operation unit 70, which is mainly used to, for example, determine a selection item.

A moving image button 76 is used to issue an instruction for starting and stopping of moving image capturing (recording). An automatic exposure (AE) lock button 77, which is included in the operation unit 70, is usable to fix an exposure state when being pressed in an image capturing standby state. An enlargement button 78, which is included in the operation unit 70, is an operation button used to switch between turning-on and turning-off of an enlargement mode in live view displaying of the image capturing mode. Operating the main electronic dial 71 after turning-on of the enlargement mode enables performing enlargement or reduction of a live view (LV) image. In the playback mode, the enlargement button 78 functions as a button used to enlarge a playback image and increase the enlargement ratio. A playback button 79, which is included in the operation unit 70, is an operation button used to switch between the image capturing mode and the playback mode. When the playback button 79 is pressed during the image capturing mode, the imaging apparatus 100 transitions to the playback mode, thus causing the display unit 28 to display the latest image out of images recorded on a recording medium 200 (FIG. 2). A menu button 81 is included in the operation unit 70 and, when the menu button 81 is pressed, various settable menu screens are displayed on the display unit 28. The user is able to intuitively perform various settings with use of a menu screen displayed on the display unit 28, the arrow keys 74, and the SET button 75.

A touch bar 82 is a line-shaped touch operation member (line touch sensor) which is capable of receiving a touch operation, and is arranged at a position which is able to be operated by the thumb of the right hand of the user gripping a grip portion 90. The touch bar 82 is able to receive, for example, a tap operation (an operation of touching the touch bar 82 and then departing from the touch bar 82 without moving the touch position within a predetermined period) and rightward and leftward slide operations (operations of, after touching the touch bar 82, moving the touch position while keeping touching to the touch bar 82). The touch bar 82 is an operation member which is different from the touch panel 70a, and does not include a display function.

A communication terminal group 10 is a communication terminal group via which the imaging apparatus 100 performs communication with a lens unit (attachable to and detachable from the imaging apparatus 100). An eyepiece unit 16 is the eyepiece portion of an eyepiece viewfinder (a looking-into-type viewfinder), so that the user is able to visually recognize a video image displayed on an internal electronic viewfinder (EVF) 29 (FIG. 2) via the eyepiece unit 16. An eye access detection unit 57 is an eye access detection sensor which detects whether the user is accessing the eyepiece unit 16. A lid 83 is the lid of a slot which contains the recording medium 200. A grip portion 90 is a holding portion configured to be in a shape able to be easily gripped by the right hand of the user when the user holds the imaging apparatus 100. The shutter button 61 and the main electronic dial 71 are located at positions where the shutter button 61 and the main electronic dial 71 are able to be operated with the index finger of the right hand in a state in which the user holds the imaging apparatus 100 by gripping the grip portion 90 with the little finger, ring finger, and middle finger of the right hand. Moreover, the sub-electronic dial 73 and the touch bar 82 are arranged at positions where the sub-electronic dial 73 and the touch bar 82 are able to be operated with the thumb of the right hand in the same state.

Figure 2A:
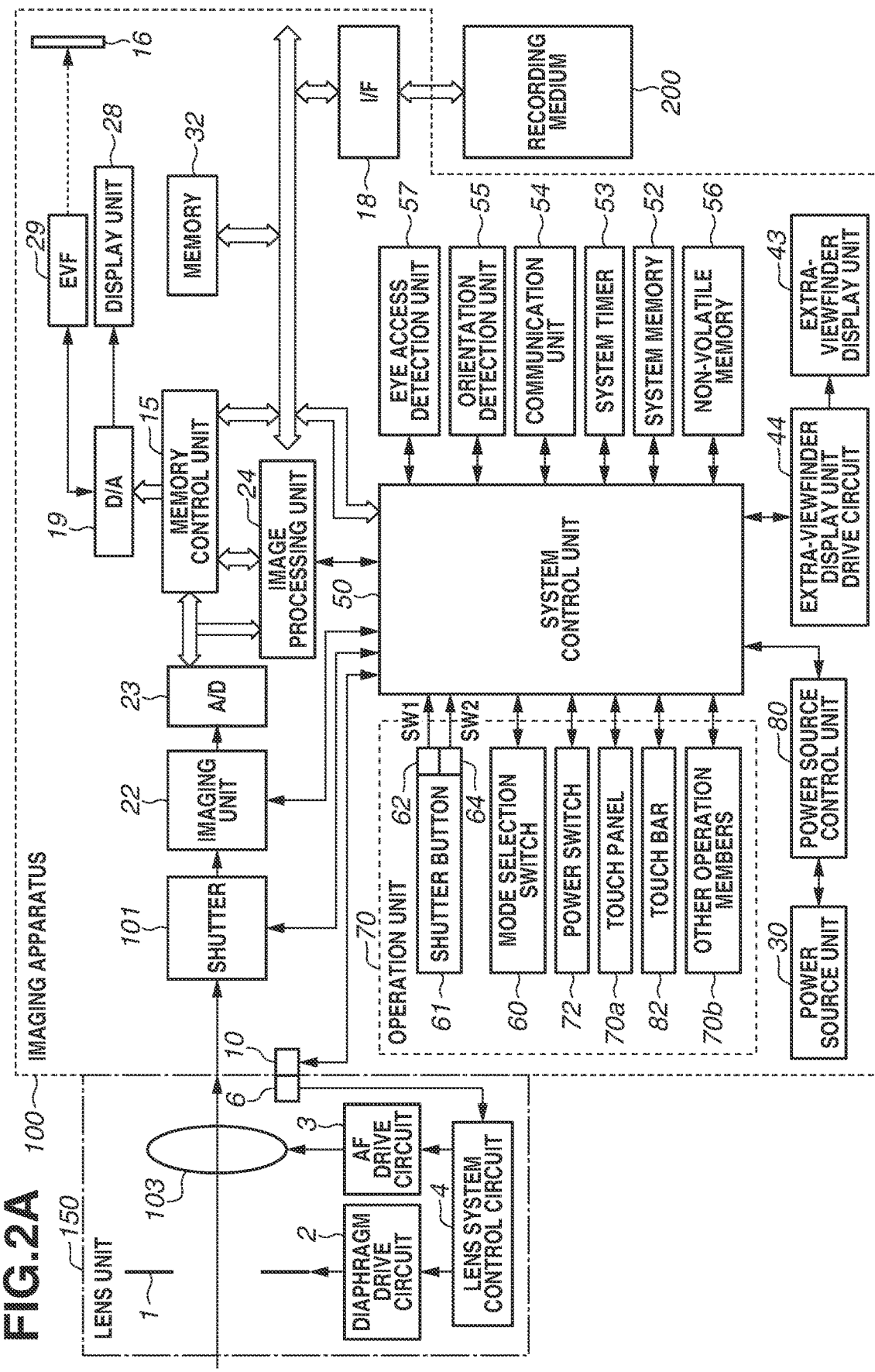
FIGS. 2A and 2B are diagrams illustrating relationships between a system control unit and various units.

FIG. 2A is a block diagram illustrating a configuration example of the imaging apparatus 100 according to the present exemplary embodiment. In FIG. 2A, a lens unit 150 is a lens unit in which an interchangeable image capturing lens is mounted. A lens 103 is usually composed of a plurality of lens elements, but, in FIG. 2A, is illustrated simply as a single lens element. A communication terminal group 6 is a communication terminal group used for the lens unit 150 to perform communication with the imaging apparatus 100, and a communication terminal group 10 is a communication terminal group used for the imaging apparatus 100 to perform communication with the lens unit 150. The lens unit 150 performs communication with a system control unit 50 via the communication terminal groups 6 and 10, causes a lens system control circuit 4, which is included in the lens unit 150, to perform control of a diaphragm 1 via a diaphragm drive circuit 2, and varies the position of the lens 103 via an autofocus (AF) drive circuit 3, thus adjusting focus to a subject image.

A shutter 101 is a focal plane shutter capable of freely controlling the exposure time of an imaging unit 22 under the control of the system control unit 50.

The imaging unit 22 is an image sensor configured with, for example, a charge-coupled device (CCD) sensor or a complementary metal-oxide semiconductor (CMOS) sensor, which converts an optical image into an electrical signal. The imaging unit 22 can include an image capturing plane phase-difference sensor which outputs defocus amount information to the system control unit 50. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as reduction, and color conversion processing on the data output from the A/D converter 23 or data read out from a memory control unit 15. Moreover, the image processing unit 24 performs predetermined calculation processing using the captured image data. The system control unit 50 performs exposure control and distance measurement control based on a calculation result obtained by the image processing unit 24. With this, autofocus (AF) processing of the through-the-lens (TTL) type, automatic exposure (AE) processing, and electronic flash (EF) (flash preliminary light emission) processing are performed. The image processing unit 24 further performs predetermined calculation processing using the captured image data, and performs automatic white balance (AWB) processing of the TTL type based on the obtained calculation result.

Data output from the A/D converter 23 is written in the memory 32 via the image processing unit 24 and the memory control unit 15 or directly via the memory control unit 15 without via the image processing unit 24. The memory 32 stores image data acquired by the imaging unit 22 and converted into digital data by the A/D converter 23 or image data that is to be displayed on the display unit 28 and the EVF 29. The memory 32 has a storage capacity sufficient to store a predetermined number of still images or a moving image and sound taken for a predetermined time.

Moreover, the memory 32 also serves as a memory for image display (video memory). A digital-to-analog (D/A) converter 19 converts data for image display stored in the memory 32 into an analog signal and supplies the analog signal to the display unit 28 and the EVF 29. In this way, image data for display stored in the memory 32 is then displayed on the display unit 28 and the EVF 29 via the D/A converter 19. The display unit 28 and the EVF 29 perform display corresponding to the analog signal supplied from the D/A converter 19 on a display device, such as a liquid crystal display (LCD) or an organic electroluminescent display (EL). A digital signal obtained by A/D conversion performed once by the A/D converter 23 and stored in the memory 32 is then converted into an analog signal by the D/A converter 19, and the analog signal is then sequentially transferred to the display unit 28 or the EVF 29 and displayed thereon, so that live view display (LV display) is performed. Hereinafter, an image which is displayed in live view is referred to as a "live view image (LV image)".

The extra-viewfinder display unit 43 is configured to display various setting values of the imaging apparatus 100 including, for example, a shutter speed and an aperture value via an extra-viewfinder display unit drive circuit 44.

A non-volatile memory 56 is an electrically erasable and recordable memory, for which, for example, an electrically erasable programmable read-only memory (EEPROM) is used. For example, constants and a program for operations of the system control unit 50 are stored in the non-volatile memory 56. The program as used here is a computer program which is executed to implement various flowcharts described below in the present exemplary embodiment.

The system control unit 50 is a control unit composed of at least one processor or circuit, and controls the entire imaging apparatus 100. The system control unit 50 implements various processing operations described below in the present exemplary embodiment by executing the above-mentioned program recorded on the non-volatile memory 56. A system memory 52 includes, for example, a random access memory (RAM), on which, for example, constants and variables for operations of the system control unit 50 and a program read out from the non-volatile memory 56 are loaded. Moreover, the system control unit 50 also performs display control by controlling, for example, the memory 32, the D/A converter 19, and the display unit 28.

A system timer 53 is a timer unit which measures times for use in various control operations and time in a built-in clock.

The operation unit 70 is an operation unit via which the user inputs various operation instructions to the system control unit 50.

The mode selection switch 60, which is included in the operation unit 70, switches an operation mode of the system control unit 50 to any one of, for example, a still image capturing mode, a moving image capturing mode, and a playback mode. Modes included in the still image capturing mode include an automatic image capturing mode, an automatic scene discrimination mode, a manual mode, an aperture priority mode (Av mode), a shutter speed priority mode (Tv mode), and a program automatic exposure (AE) mode (P mode). Moreover, the modes included in the still image capturing mode further include, for example, various scene modes in which image capturing settings for the respective image capturing scenes are performed and a custom mode. The mode selection switch 60 is used for the user to directly switch the operation mode of the system control unit 50 to any one of these modes. Alternatively, after switching to displaying of a list screen for image capturing modes is once performed by the mode selection switch 60, another operation member can also be used to perform switching to any one of a plurality of image capturing modes displayed in the list screen. Likewise, a plurality of modes can also be included in the moving image capturing mode.

A first shutter switch 62 is configured to be turned on in response to a halfway operation, in other words, a half-pressed state, of the shutter button 61 of the imaging apparatus 100 (an image capturing preparation instruction), thus generating a first shutter switch signal SW1. In response to the first shutter switch signal SW1, image capturing preparation operations, such as autofocus (AF) processing, automatic exposure (AE) processing, automatic white balance (AWB) processing, and flash preliminary emission (EF) processing, are started.

A second shutter switch 64 is configured to be turned on in response to a complete operation, in other words, a fully-pressed state, of the shutter button 61 (an image capturing instruction), thus generating a second shutter switch signal SW2. In response to the second shutter switch signal SW2, the system control unit 50 starts a series of image capturing processing operations starting with a signal readout operation from the imaging unit 22 and leading to a writing operation for the captured image data as an image file to the recording medium 200.

The operation unit 70 includes various operation members serving as an input portion which receives an operation performed by the user.

The operation unit 70 includes at least the following operation portions. The operation portions include the shutter button 61, the main electronic dial 71, the power switch 72, the sub-electronic dial 73, the arrow keys 74, the SET button 75, the moving image button 76, the AE lock button 77, the enlargement button 78, the playback button 79, the menu button 81, and the touch bar 82. Other operation members 70b collectively represent operation members which are not individually illustrated in the block diagram of FIG. 2A.

A power source control unit 80 is configured with, for example, a battery detection circuit, a DC-DC converter, and a switch circuit for switching blocks to be energized, and detects the presence or absence of attachment of a battery, the type of a battery, and the remaining amount of battery power. Moreover, the power source control unit 80 controls the DC-DC converter based on a result of such detection and an instruction from the system control unit 50, and supplies required voltages to various portions, including the recording medium 200, for respective required periods. A power source unit 30 includes, for example, a primary battery, such as an alkaline battery or a lithium battery, a secondary battery, such as a nickel-cadmium (NiCd) battery, a nickel-metal hydride (NiMH) battery, or a lithium (Li) battery, or an alternating current (AC) adapter.

A recording medium interface (I/F) 18 is an interface with the recording medium 200, such as a memory card or a hard disk. The recording medium 200 is a recording medium, such as a memory card, which is used to record an image obtained by image capturing, and is configured with, for example, a semiconductor memory or a magnetic disc.

A communication unit 54 connects to an external device or a network via wireless or via a wired cable, and performs transmission and reception of, for example, a video signal and an audio signal. The communication unit 54 is also able to connect to a wireless local area network (LAN) or the Internet. Moreover, the communication unit 54 is also able to communicate with an external device via Bluetooth® or Bluetooth Low Energy. The communication unit 54 is able to transmit an image (including an LV image) captured by the imaging unit 22 and an image recorded on the recording medium 200, and is also able to receive an image or various other pieces of information from an external device.

An orientation detection unit 55 detects the orientation of the imaging apparatus 100 with respect to the direction of gravitational force. Whether an image captured by the imaging unit 22 is an image captured with the imaging apparatus 100 held in a landscape orientation or an image captured with the imaging apparatus 100 held in a portrait orientation can be discriminated based on the orientation detected by the orientation detection unit 55. The system control unit 50 is able to append orientation information corresponding to the orientation detected by the orientation detection unit 55 to an image file of the image captured by the imaging unit 22 or to perform recording with an image rotated. The orientation detection unit 55 to be used includes, for example, an acceleration sensor and a gyroscope sensor. The acceleration sensor or gyroscope sensor serving as the orientation detection unit 55 is able to be used to detect motions of the imaging apparatus 100 (for example, panning, tilting, lifting, and being kept still or not).

Figure 2B:
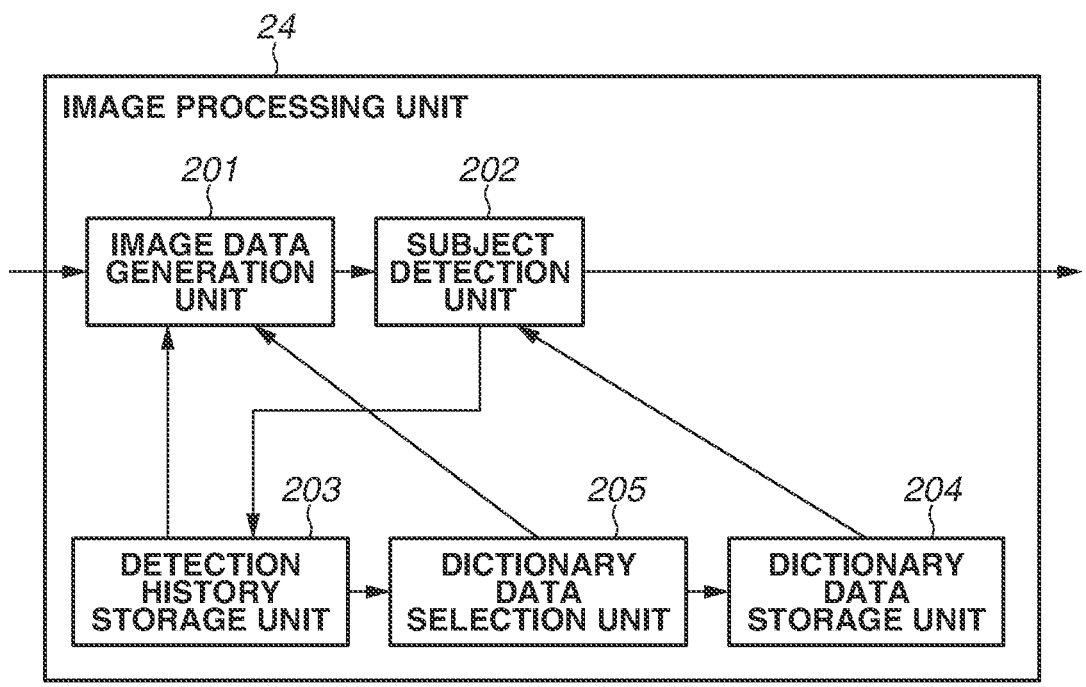

FIG. 2B illustrates a configuration characteristic in the present exemplary embodiment included in the image processing unit 24. The image processing unit 24 includes an image data generation unit 201, a subject detection unit 202, a detection history storage unit 203, a dictionary data storage unit 204, and a dictionary data selection unit 205. The image data generation unit 201, the subject detection unit 202, the detection history storage unit 203, the dictionary data storage unit 204, and the dictionary data selection unit 205 can be a part of the system control unit 50, or can be provided separately from the image processing unit 24 and the system control unit 50. The image processing unit 24 can be mounted in, for example, a smartphone or a tablet terminal.

The image processing unit 24 sends, to the image data generation unit 201 included in the image processing unit 24, image data generated based on data output from the A/D converter 23.

In a case where dictionary data for entire area detection is currently selected by the dictionary data selection unit 205 described below, the image data generation unit 201 generates image data to be used for entire area detection by the subject detection unit 202, with use of the input image data, and sends the generated image data to the subject detection unit 202. On the other hand, in a case where dictionary data for local area detection is currently selected by the dictionary data selection unit 205, the image data generation unit 201 generates image data to be used for local area detection by the subject detection unit 202, based on a detection history stored in the detection history storage unit 203 described below, and sends the generated image data to the subject detection unit 202. Specific generation methods for respective pieces of image data for entire area detection and local area detection are described below.

With respect to the image data input from the image data generation unit 201, the subject detection unit 202 receives dictionary data determined by the dictionary data selection unit 205 from among pieces of dictionary data generated with machine learning stored in the dictionary data storage unit 204 and thus performs subject detection based on the received dictionary data. The subject detection unit 202 estimates, for example, the position of a subject included in the image data as a detection result, and outputs a result of estimation to the detection history storage unit 203 and the outside of the configuration illustrated in FIG. 2B.

In the present exemplary embodiment, the subject detection unit 202 is configured with a convolutional neural network (CNN) subjected to machine learning, and performs entire area detection and local area detection for a specific subject. A subject which is available for entire area detection and local area detection is based on dictionary data stored in the dictionary data storage unit 204. In the present exemplary embodiment, the subject detection unit 202 is configured to use respective different CNNs between entire area detection and local area detection. Additionally, the subject detection unit 202 can be configured to use respective different CNNs depending on detectable subjects. The subject detection unit 202 can be implemented by a graphics processing unit (GPU) or a circuit dedicated to estimation processing by a CNN.

Machine learning for a CNN can be performed by an optional method. For example, a predetermined computer such as a server performs machine learning for a CNN, and the imaging apparatus 100 can acquire the learned (trained) CNN from the predetermined computer. In the present exemplary embodiment, the predetermined computer receives image data for learning as an input and performs supervised learning with, for example, positional information about a subject corresponding to the image data for learning set as training data (annotation), so that learning for a CNN which is used by the subject detection unit 202 is performed. With the above-mentioned method, a learned (trained) CNN is generated. Learning for a CNN can be performed by the imaging apparatus 100 or the above-mentioned image processing apparatus.

As mentioned above, the subject detection unit 202 includes a CNN trained with machine learning (learned model or trained model). The subject detection unit 202 receives image data as an input, estimates, for example, the position, size, or reliability of a subject, and outputs the estimated information. The CNN can be, for example, a network in which a fully coupled layer and an output layer are coupled to a layer structure having a convolution layer and a pooling layer alternately stacked on each other. In this case, as a learning method for the CNN, for example, an error backpropagation method can be applied. Moreover, the CNN can be a CNN of neocognitron including a feature detection layer (S-layer) and a feature integration layer (C-layer) as a set. In this case, as a learning method for the CNN, a learning method called "Add-if Silent" can be applied.

An optional learned model other than the learned CNN can be used for the subject detection unit 202. For example, a learned model generated with machine learning, such as a support vector machine or a decision tree, can be applied to the subject detection unit 202. Moreover, a method which is not a learned model generated with machine learning can be applied to the subject detection unit 202. For example, an optional subject detection method which does not use machine learning can be applied to the subject detection unit 202.

The detection history storage unit 203 stores a subject detection history detected by the subject detection unit 202 in image data, and the system control unit 50 sends the subject detection history to the image data generation unit 201 and the dictionary data selection unit 205. In the present exemplary embodiment, while the subject detection history includes dictionary data which was used for detection, the number of times of performed detection, the position of the detected subject, and the identifier of image data in which the detected subject was included, the detection history storage unit 203 can be configured to store at least one of these pieces of data.

The dictionary data storage unit 204 stores dictionary data for detection of a specific subject, and the system control unit 50 reads out dictionary data selected by the dictionary data selection unit 205 from the dictionary data storage unit 204 and sends the read-out dictionary data to the subject detection unit 202. Each piece of dictionary data is, for example, data in which features of the respective areas of a specific subject are registered. Additionally, to detect a plurality of types of subjects, pieces of dictionary data for respective subjects and for respective areas of each subject can be used. Accordingly, a plurality of pieces of dictionary data is stored in the dictionary data storage unit 204. The dictionary data storage unit 204 stores pieces of dictionary data for detection of a plurality of types of subjects, such as dictionary data for detecting "person", dictionary data for detecting "animal", and dictionary data for detecting "vehicle". Additionally, the dictionary data storage unit 204 also stores dictionary data for detecting "bird", which is special in shape from among animals, separately from "animal".

Additionally, the dictionary data for detecting "vehicle" can be segmentalized into pieces of dictionary data for detecting respective specific subjects, such as "automobile", "motorcycle", "train", and "airplane", so that pieces of dictionary data for respective specific subjects can be individually stored.

In the present exemplary embodiment, additionally, dictionary data for entire area detection and dictionary data for local area detection are prepared for each of the above-mentioned specific subjects. An entire area of a specific subject can be set, in the literature, as an area including the entire subject or can be set as an area including a central portion, i.e., the main body, of a subject. For example, an entire area of a subject concerning "vehicle" is able to be defined for each type of subject, such as the "vehicle body" of an automobile or motorcycle, the "first car" of a train, or the "body portion" of an airplane. Moreover, the definition of a local area represents a partial area in a subject specified in the entire area. For example, the local area is set as the one included in the entire area, such as the "eyes of a person" serving as a local area relative to the "entire face of a person" serving as an entire area or the "eyes of an animal" serving as a local area relative to the "entire face of an animal" serving as an entire area. With respect to "bird", similarly, the "entire area of a bird" or the "entire face of a bird" is targeted for detection as an entire area and the "eyes of a bird" is targeted for detection as a local area, so that dictionary data dedicated to "bird" is also stored. Moreover, the positional relationship between an entire area and a local area can be a positional relationship in which the local area is not included in the entire area, such as a relationship between the "entire vehicle body of a motorcycle" serving as an entire area and the "helmet of a driver", which protrudes from the vehicle body of a motorcycle, serving as a local area.

Additionally, the positional relationship between an entire area and a local area can be a relationship in which the local area does not necessarily exist in the entire area of a subject, such as a relationship between the "entire vehicle body of an automobile" and the "helmet of a driver" serving as a local area confined to a "formula car" included in automobiles.

As mentioned above, it is premised that dictionary data for local area detection is that for a partial area included in a subject detected as an entire area. Accordingly, in the present exemplary embodiment, dictionary data used for detection of a local area is generated in such a manner that an image with a background of a subject detected as an entire area is set as an input image and the position or size of a local area included in the image is set as an annotation.

The entire area of a subject detected with a plurality of pieces of dictionary data stored in the dictionary data storage unit 204 is able to be used as a focus detection area. For example, in a composition in which an obstacle exists at the front side and a subject exists at the back side, focusing on the detected entire area enables focusing on the subject.

However, for example, in a case where a focal depth difference in the entire area is large, the problem as to on which portion in the entire area to further focus occurs. To address the above-mentioned problem, confining a range with use of local area detection enables focusing on a more detailed position which is uncertain with only the entire area and focal depth difference information in the entire area, such as the "operator's seat" of a train or the "cockpit" of an airplane. Additionally, in the case of "vehicle" such as a motorcycle, a case where the focus position to be adjusted differs between a case where a person is riding a vehicle and a case where no person is riding a vehicle can be considered. Performing entire area detection and local area detection with use of dictionary data in which the entire area is set to the "entire vehicle body of a motorcycle" and the local area is set to the "helmet of a driver" enables switching a position on which to focus depending on the presence or absence of a driver with respect to the same subject.

Moreover, while, in the present exemplary embodiment, a plurality of pieces of dictionary data which is used for detection by the subject detection unit 202 is the one generated with machine learning, dictionary data generated with rule base can be used in combination. The dictionary data generated with rule base is, for example, the one determined by a designer in which the image of a subject desired to be detected or a feature quantity specific to the subject is stored. Comparing an image or a feature quantity stored in the dictionary data with an image or a feature quantity included in image data acquired by image capturing enables detecting the subject. The rule-based dictionary data is not more complex than dictionary data which a learned model sets with machine learning and is, therefore, smaller in data capacity, so that subject detection using the rule-based dictionary data is faster in processing speed (also lower in processing load) than dictionary data generated by a learned model.

The dictionary data selection unit 205 selects dictionary data to be used next, based on a detection history stored in the detection history storage unit 203, and notifies the dictionary data storage unit 204 of the selected dictionary data.

In the present exemplary embodiment, pieces of dictionary data for a respective plurality of types of subjects and for respective areas for each subject are individually stored in the dictionary data storage unit 204, and subject detection is performed a plurality of times while a plurality of pieces of dictionary data is switched with respect to the same image data. The dictionary data selection unit 205 determines a switching sequence for dictionary data based on a detection history stored in the detection history storage unit 203 or a selection made by the user described below, and determines dictionary data to be used along the determined switching sequence. An example of the switching sequence for dictionary data is described below.

In the dictionary data storage unit 204, pieces of dictionary data for detecting a plurality of types of subjects and areas of each subject are individually stored. Dictionary data to be selected by the dictionary data selection unit 205 is switched depending on the subject which has ever been detected, the type of dictionary data which has been used at that time, the type of a subject to be preferentially detected, and a combination thereof. The above-mentioned type of a subject to be preferentially detected can be preliminarily selected by the user. Moreover, a method in which the user designates a subject included in a live view screen displayed on the display unit 28 can be employed. Additionally, whether to perform local area detection can also be preliminarily selected by the user for each type of the above-mentioned dictionary data for entire area detection or in a collective manner. At this time, the system control unit 50 can display, on the display unit 28, information about the above-mentioned dictionary data selected by the user or dictionary data selected by the dictionary data selection unit 205.

Figure 3A:
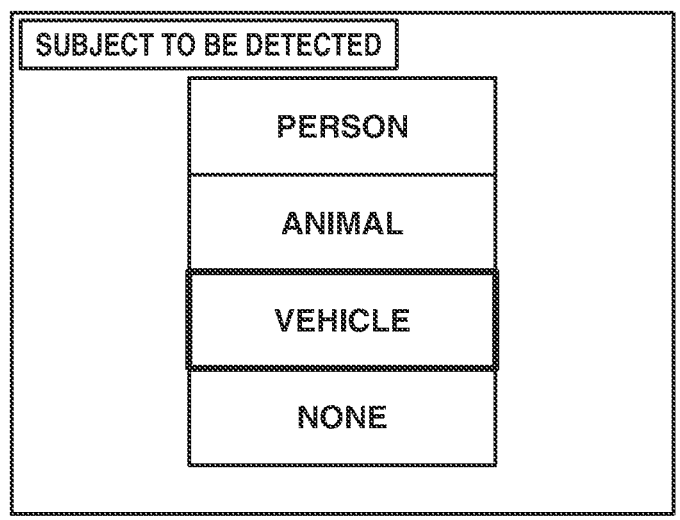
FIGS. 3A, 3B, and 3C are diagrams used to explain an example of a detection target setting method which is used by the user.
Figure 3B:
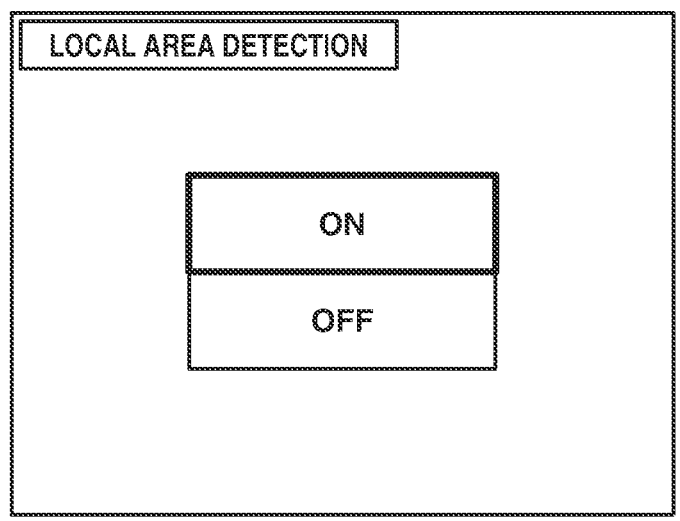
Figure 3C:
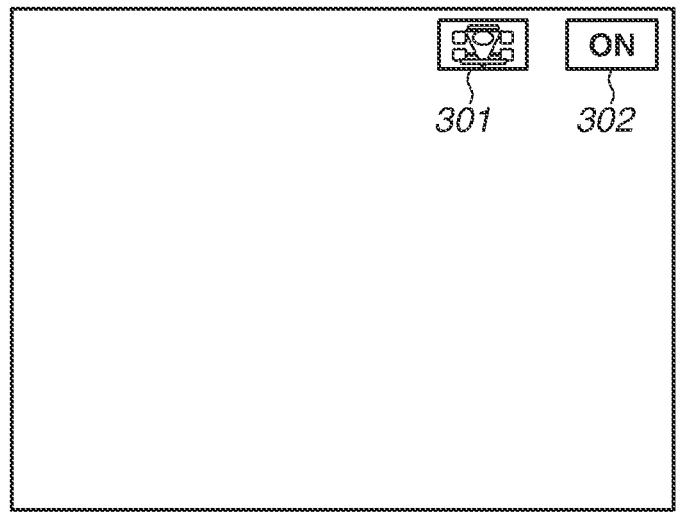

As an example, FIGS. 3A, 3B, and 3C illustrate an example in which, via a menu screen displayed on the display unit 28, the user selects the type of a subject to be preferentially detected and whether to perform local area detection. FIG. 3A illustrates a setting screen for detection subject selection, which is displayed on the display unit 28, and via which the user selects a subject to be preferentially detected (in the present exemplary embodiment, "vehicle") from specific subjects which are able to be detected (for example, vehicle, animal, and person), by performing an operation on the operation unit 70. FIG. 3B illustrates a setting screen for determining whether to perform local area detection, which is displayed on the display unit 28, and via which the user selects ON or OFF of local area detection (in the present exemplary embodiment, selects ON of local area detection), by performing an operation on the operation unit 70. FIG. 3C illustrates a live view screen which is displayed on the display unit 28 in a state in which setting of a priority detection subject and setting of local area detection have been performed. On the display unit 28, a result of selection of a subject to be preferentially detected is displayed as a subject icon 301 and a result of selection of whether to perform local area detection (or whether to display a detected result) is displayed as a local area detection ON/OFF icon 302. This enables the user to confirm the settings which the user has performed in the live view image (in the present exemplary embodiment, an operation to be performed in a case where the user has selected a vehicle as a subject to be preferentially detected and has selected ON as local area detection is described below).

Figure 4:
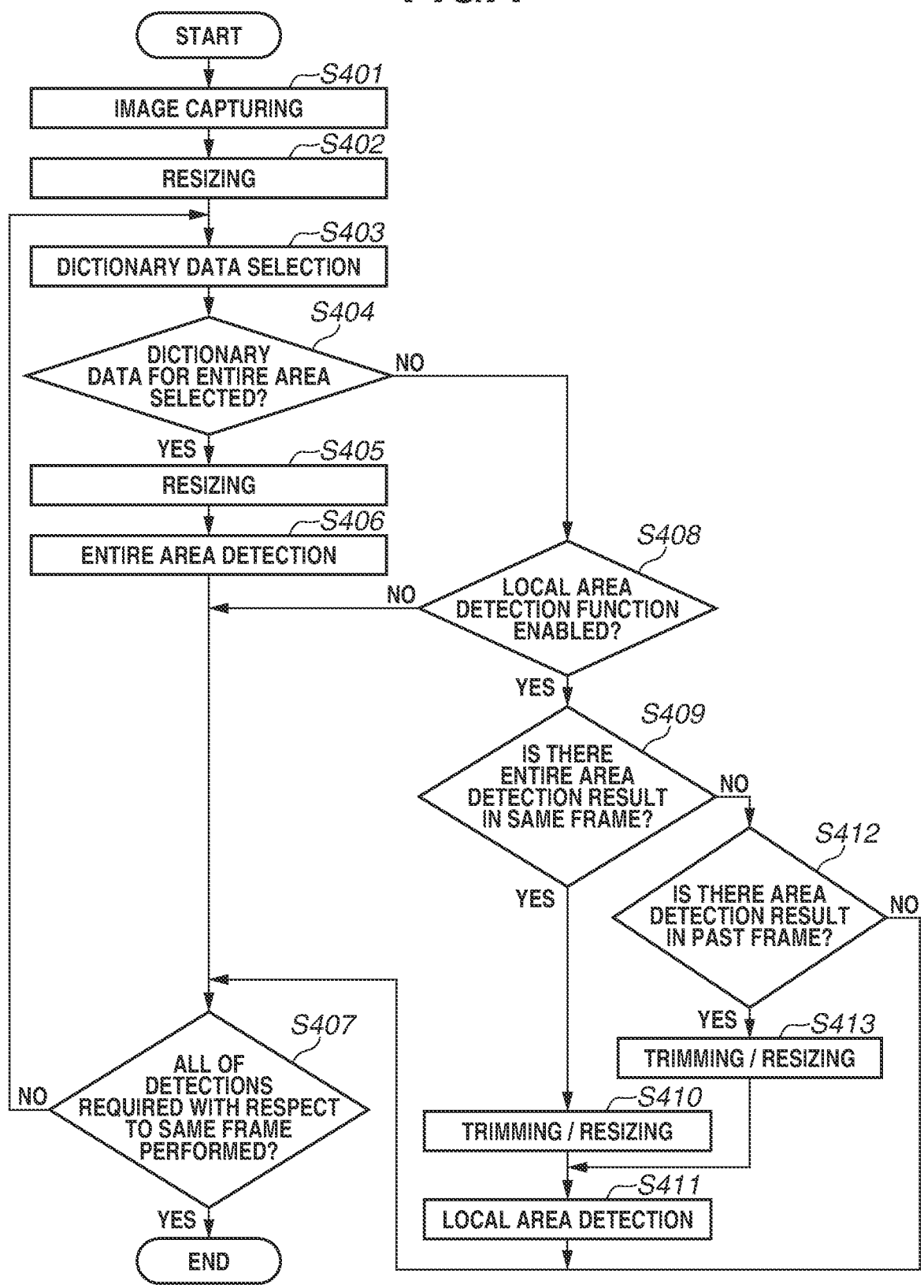
FIG. 4 is a flowchart illustrating the flow of processing which is performed in an exemplary embodiment of the present disclosure.

FIG. 4 is a flowchart illustrating the flow of characteristic processing which the imaging apparatus 100 performs in the present exemplary embodiment. Steps in the present flowchart are performed by the system control unit 50 or are performed by the respective units in response to instructions issued by the system control unit 50. At the start of the present flowchart, it is assumed that the imaging apparatus 100 is powered on and an image capturing mode for live view is ready to be performed in a state in which the user is able to issue an instruction to start image capturing (recording) of a still image or a moving image by performing an operation on the operation unit 70.

A series of processing operations in step S401 to step S413 illustrated in FIG. 4 is assumed to be processing which is performed when image capturing for one frame (one piece of image data) is performed by the imaging unit 22 of the imaging apparatus 100. However, the present exemplary embodiment is not limited to this, and a series of processing operations in step S401 to step S413 can be performed for each of a plurality of frames. Thus, for example, a result obtained by subject detection performed for the first frame can be reflected in subject detection to be performed for any frame of the second frame and subsequent frames.

In step S401, the system control unit 50 acquires captured image data which has been obtained by image capturing performed by the imaging unit 22 and has then been output from the A/D converter 23.

In step S402, the image processing unit 24 resizes the image data in conformity with an easily processable image size (for example, Quarter Video Graphics Array (QVGA)), and sends the resized image data to the image data generation unit 201.

In step S403, the dictionary data selection unit 205 selects dictionary data to be used for subject detection, and sends information indicating what is the selected dictionary data to the dictionary data storage unit 204 and the image data generation unit 201.

In step S404, the system control unit 50 determines whether dictionary data for entire area detection has been selected by the dictionary data selection unit 205 in step S403. If it is determined that the result of determination in step S404 is yes (YES in step S404), the system control unit 50 advances the processing to step S405, and, if it is determined that the result of determination in step S404 is no (NO in step S404), the system control unit 50 advances the processing to step S408.

In step S405, in response to the dictionary data for entire area detection being selected, the image data generation unit 201 performs processing for resizing the entire image area into a size to be input to the subject detection unit 202, and sends the resized image data to the subject detection unit 202.

In step S406, the subject detection unit 202 outputs, to the system control unit 50, information about, for example, the position, size, and reliability of a subject which the subject detection unit 202 has detected with use of dictionary data for entire area detection, which is stored in the dictionary data storage unit 204 and is used to detect the entire area of a specific subject (object). At this time, the system control unit 50 then stores, in the detection history storage unit 203, the output of the subject detection unit 202, the type of the dictionary data used by the subject detection unit 202, and the identifier of image data used for detection. Additionally, at this time, the system control unit 50 can display, on the display unit 28, a part or the whole of the information which the subject detection unit 202 has output. Moreover, the system control unit 50 can change the above-mentioned display method depending on the used dictionary data.

In step S407, the system control unit 50 determines whether the subject detection unit 202 has performed detection with use of all of the pieces of dictionary data required with respect to image data having the same identifier (image data in the same frame) based on a detection history stored in the detection history storage unit 203. If it is determined that the result of determination in step S407 is yes (YES in step S407), the system control unit 50 ends the processing, and, if it is determined that the result of determination in step S407 is no (NO in step S407), the system control unit 50 returns the processing to step S403 to select dictionary data to be used next.

In step S408, the system control unit 50 determines whether a local area detection function is currently set to ON, and, if it is determined that the result of determination in step S408 is yes (YES in step S408), the system control unit 50 advances the processing to step S409, and, if it is determined that the result of determination in step S408 is no (NO in step S408), the system control unit 50 advances the processing to step S407.

In step S409, the system control unit 50 checks whether the entire area has previously been detected in the past detection of image data having the same identifier as that of image data to be subjected to detection from now based on a detection history stored in the detection history storage unit 203. If it is determined that the result of checking in step S409 is yes (YES in step S409), the system control unit 50 advances the processing to step S410, and, if it is determined that the result of checking in step S409 is no (NO in step S409), the system control unit 50 advances the processing to step S412.

In step S410, the image data generation unit 201 performs trimming processing of image data for subject detection based on a detection result of the entire area of image data having the same identifier (in the same frame) as that of image data to be subjected to detection from now, stored in the detection history storage unit 203. Specifically, the image data generation unit 201 sets, as a trimming area, an area broader by a predetermined angle of view (a predetermined number of pixels) than the entire area of a subject from an area in which the entire area of the subject has been detected. How much broader to set a trimming area from the detected entire area can be set to a size or ratio which differs depending on a subject targeted for detection. In step S410, additionally, the image data generation unit 201 resizes image data subjected to trimming processing in conformity with an input size for the subject detection unit 202, and sends the trimmed and resized image data to the subject detection unit 202.

In step S411, the subject detection unit 202 outputs, to the system control unit 50, information about, for example, the position, size, and reliability of a subject which the subject detection unit 202 has detected with use of dictionary data for local area detection stored in the dictionary data storage unit 204. At this time, the system control unit 50 then stores, in the detection history storage unit 203, the output of the subject detection unit 202, the type of the dictionary data used by the subject detection unit 202, and the identifier of image data used for detection. Additionally, at this time, the system control unit 50 can display, on the display unit 28, a part or the whole of the information which the subject detection unit 202 has output. Moreover, the system control unit 50 can change the above-mentioned display method depending on the used dictionary data.

In step S412, the system control unit 50 checks whether there is a detection result of an entire area or local area of the same subject in a past frame based on a detection history stored in the detection history storage unit 203. While, in the present exemplary embodiment, the past frame means a frame corresponding to image data captured one frame before in chronological order and then output to the image processing unit 24 with respect to image data having the same identifier, the number of frames by which to track back is not limited as long as the past frame is a frame earlier on a time-series basis. If it is determined that the result of checking in step S412 is yes (YES in step S412), the system control unit 50 advances the processing to step S413, and, if it is determined that the result of checking in step S412 is no (NO in step S412), the system control unit 50 advances the processing to step S407.

In step S413, the image data generation unit 201 performs trimming processing corresponding to an angle of view to be input to the subject detection unit 202 as needed. In the present exemplary embodiment, the image data generation unit 201 performs the trimming processing based on a detection result in the past image data stored in the detection history storage unit 203. Additionally, in step S413, the image data generation unit 201 resizes image data subjected to the above-mentioned trimming processing in conformity with an input size for the subject detection unit 202, and sends the trimmed and resized image data to the subject detection unit 202.

According to step S409, step S410, step S412, and step S413, an increase in performance of local area detection using dictionary data generated with machine learning is expected.

The relationship between the above-mentioned increase in performance of local area detection and step S412 and step S413 is described. In the present exemplary embodiment, in step S412, the system control unit 50 checks whether the entire area of a subject has previously been detected in image data having the same identifier as that of image data to be subjected to detection from now based on a detection history stored in the detection history storage unit 203. In a case where the entire area of a subject has previously been detected, then in step S413, as mentioned above, the image data generation unit 201 performs resizing in an area corresponding to the angle of view of the entire image or performs resizing of image data based on the position and broadness of the previously detected entire area of a subject.

Here, dictionary data generated with machine learning is able to be generated by extracting, from a large quantity of pieces of image data in which a specific subject exists, common features of the specific subject. The common features also include, in addition to, for example, the size, position, and color of a subject, an area outside the specific subject, such as a background thereof. Accordingly, as a background in which a subject targeted for detection exists is more limited, the detection performance (detection accuracy) is more apt to increase with small learning. On the other hand, if learning is performed in such a way as to try to cause a specific subject to be detected without recourse to a background, although the versatility to image capturing scenes is high, the detection accuracy is unlikely to increase. As pieces of image data to be used for dictionary data generation are larger in number and more diverse, the detection performance tends to increase. On the other hand, if the size or position of a detection area for a subject to be detected in image data used for detection is limited to a fixed value, it is possible to increase the detection performance even if the number or diversity of pieces of image data required for dictionary data generation is narrowed down. Moreover, in a case where a part of the subject is cut off to the outside of image data, since some of features included in the subject are lost, the detection performance becomes lower.

Moreover, usually, as the area of a subject is larger, the number of features included in the subject is larger. In the case of the above-mentioned detection using dictionary data generated with machine learning, instead of a specific subject to be detected with use of the dictionary data, an object having features similar to those of the specific subject may be erroneously detected as the specific subject. An area which is defined as a local area is an area narrower than the entire area. As an area is narrower, a feature quantity included in the area decreases, and, as the feature quantity is smaller, the number of objects having similar features increases, so that an erroneous detection increases.

Figure 5A:
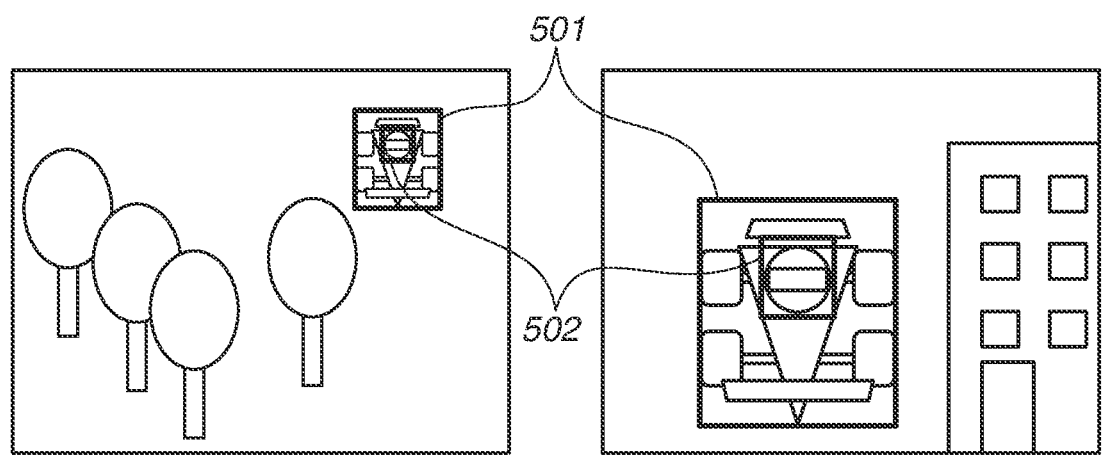
FIGS. 5A and 5B are diagrams illustrating examples of a positional relationship between an entire area and a local area.
Figure 5B:
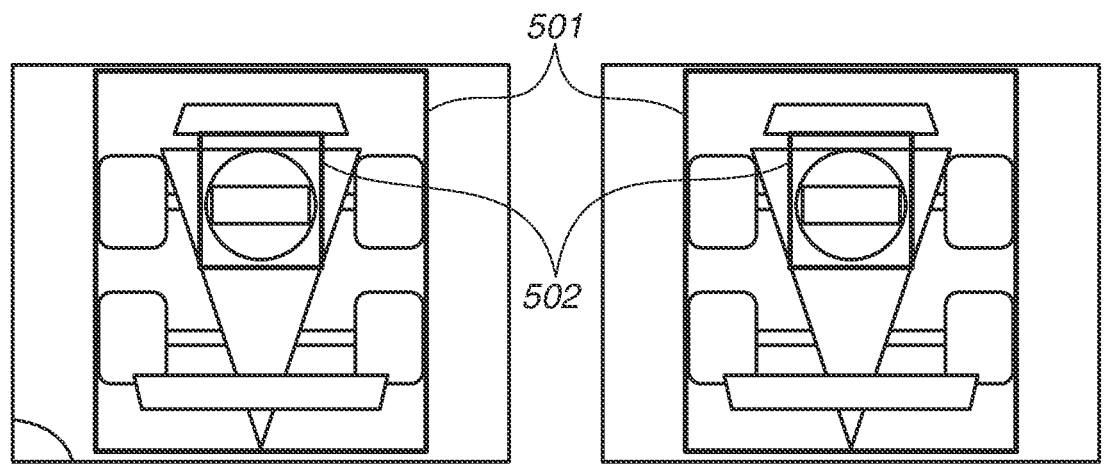

FIGS. 5A and 5B are diagrams illustrating an example of a positional relationship between an entire area and a local area in a case where the entire area is defined as the "entire vehicle body" of an automobile and the local area is defined as the "helmet of a driver". In FIGS. 5A and 5B, the local area 502 is contained in the entire area 501. FIG. 5A illustrates two pieces of image data in which the same vehicle exists at respective different positions, distances, and backgrounds. Moreover, FIG. 5B illustrates images obtained by trimming the above-mentioned two pieces of image data based on the entire area of an automobile. As compared with FIG. 5A, performing trimming based on the entire area as with two images illustrated in FIG. 5B enables generating image data in which the variations of position, size, and background of the local area are narrowed down.

In a case where local area detection is performed from the entire image data (the entire angle of view) irrespective of the presence or absence of a history of entire area detection, pieces of image data about various image capturing scenes (also including subjects and backgrounds) have to be prepared and pieces of dictionary data for detecting a local area while preventing an erroneous detection have to be generated. On the other hand, in the present exemplary embodiment, in a where a scene in which the entire area of a subject has previously been detected in the past frame has become undetected, i.e., in a scene in which the entire area of a subject has become too large to the extent of being cut off from the image capturing angle of view, a local area is also detected from the entire image. This is because it is supposed that, at this time, the subject is sufficiently large and, even if a local area is detected from the entire image, the great majority of the background is an area of the subject and, even if dictionary data learned on the premise that the background is a subject is used, it is possible to perform detection with sufficiently high performance. Alternatively, as another exemplary embodiment, using, for local area detection, image data obtained by trimming the current processing target frame based on the position and broadness of the entire area of a subject detected in the past frame enables reducing the occurrence of an erroneous detection and increasing the detection performance. Moreover, in a learned model for local area detection in the present exemplary embodiment, since it is possible to reduce variations of image data to be used for detection, it is possible to reduce the amounts of image data and annotation data to be used for learning.

Next, the relationship between the above-mentioned increase in performance of local area detection and step S412 is described. In the present exemplary embodiment, in a case where a history showing that an entire area has been detected in image data having the same identifier as that of image data to be subjected to detection from now does not exist in a detection history stored in the detection history storage unit 203, it is determined whether to perform local area detection while referring to the past history.

Figure 6A:
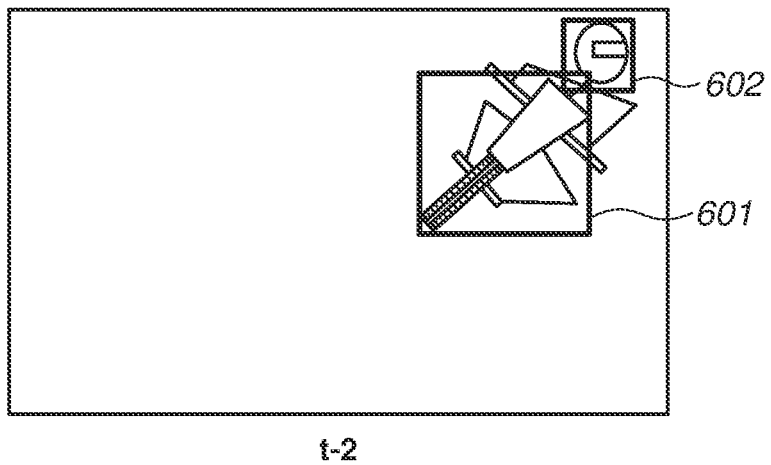
FIGS. 6A, 6B, and 6C are diagrams illustrating a time series variation of a captured image obtained at the time of image capturing of a subject.
Figure 6B:
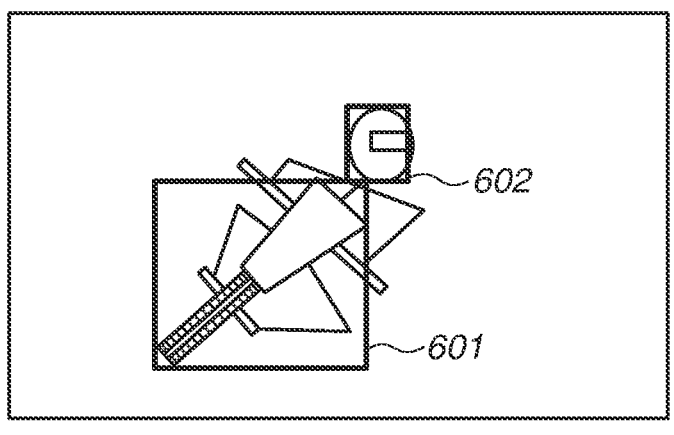
Figure 6C:
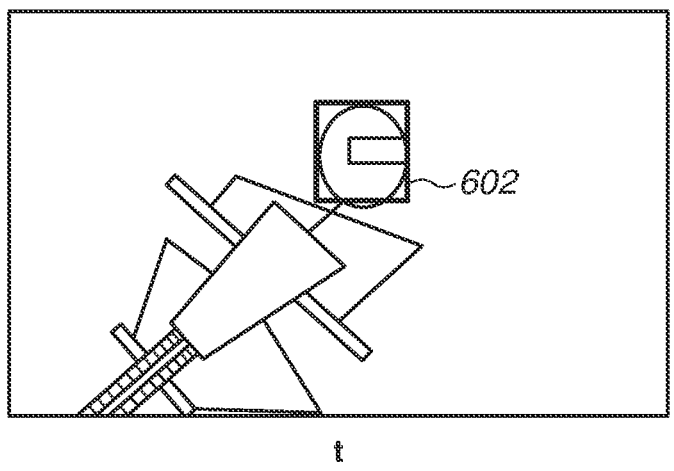

FIGS. 6A, 6B, and 6C are diagrams illustrating an example of a positional relationship between an entire area and a local area in a case where the entire area is defined as the "entire vehicle body" of a motorcycle and the local area is defined as the "helmet of a driver". In FIGS. 6A to 6C, the local area 602 is not contained in the entire area 601. FIGS. 6A to 6C illustrate a time series variation of captured image data in a case where the subject is coming close to the imaging apparatus 100 in the order from FIG. 6A to FIG. 6C. FIG. 6A illustrates an example in which, since the subject is small, the local area is not able to be detected, and FIG. 6C illustrates an example in which, since a part of the subject is cut off, the entire area is not able to be detected. In a situation in which the subject is coming close from the back side to the front side as illustrated in FIGS. 6A to 6C, in a case where the entire area or local area of the subject has previously been detected at times close to each other as illustrated in FIG. 6B relative to FIG. 6C, there is a high possibility of the subject existing even in next image data.

Therefore, the system control unit 50 reads out a detection history of image data in a past frame stored in the detection history storage unit 203 and determines whether the entire area or local area of a subject has previously been detected in image data obtained at times close to each other. Only in a case where any of the entire area and local area has previously been detected, the system control unit 50 detects the local area even in a case where the entire area of the subject has not been able to be detected in specific image data. The system control unit 50 can have an assumption that the subject is coming close to the imaging apparatus 100 as illustrated in FIGS. 6A to 6C and determine whether the entire area of the subject has been becoming larger at respective times (along with the elapse of time). Additionally, for example, the system control unit 50 can perform scene switching determination by calculating the amount of change of the entire image data or the entire area of the subject from the past image data. As a result, in a case where the scene has switched to a large extent, even if the entire area or local area has previously been detected in image data obtained at times close to each other, the system control unit 50 can be configured not to perform local area detection. Here, the system control unit 50 compares image data obtained at the close time with image data obtained at the current time and, in a case where the amount of change of image data has become greater than or equal to a given threshold value, the system control unit 50 determines that the scene has switched to a large extent.

Increasing the opportunity of local area detection only with respect to image data in which there is a high possibility of a local area existing enables reducing an opportunity to determine an erroneous area as a local area in a case where no local area exists or in a case where another object resembling a local area exists, thus increasing the performance for local area detection.

Moreover, the relationship between the above-mentioned increase in performance for local area detection and step S413 is described. In the present exemplary embodiment, the system control unit 50 determines whether a history showing that an entire area has been detected in image data having the same identifier as that of image data targeted for processing (second image data) exists in a detection history stored in the detection history storage unit 203. As a result, in a case where the history does not exist, the system control unit 50 performs detection processing based on a detection history of an entire area or local area in past image data (first image data).

Figure 7A:
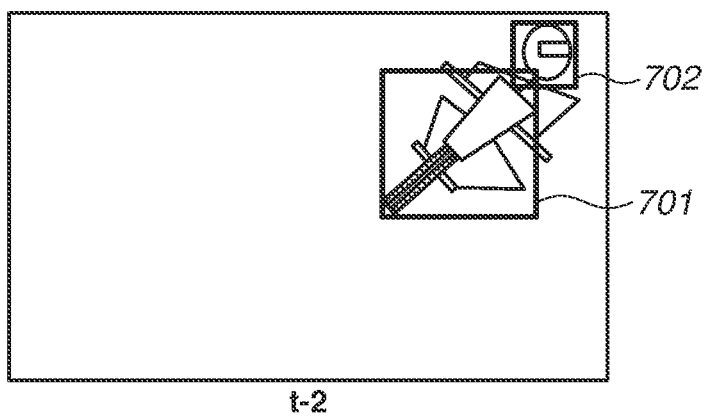
FIGS. 7A, 7B, 7C, and 7D are diagrams illustrating an example of a trimming method for image data which is used for subject detection.
Figure 7B:
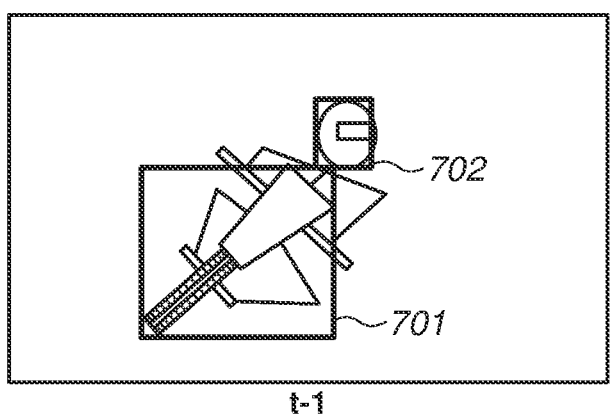
Figure 7C:
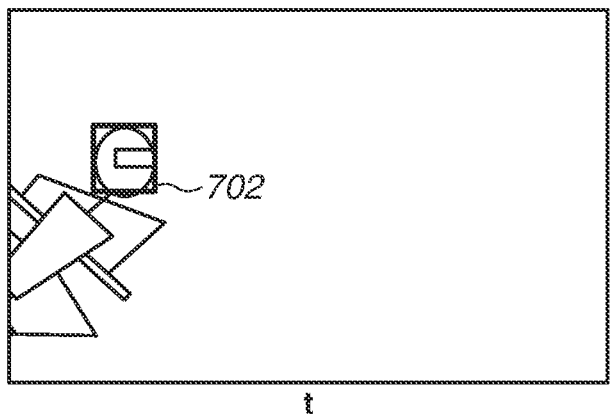
Figure 7D:
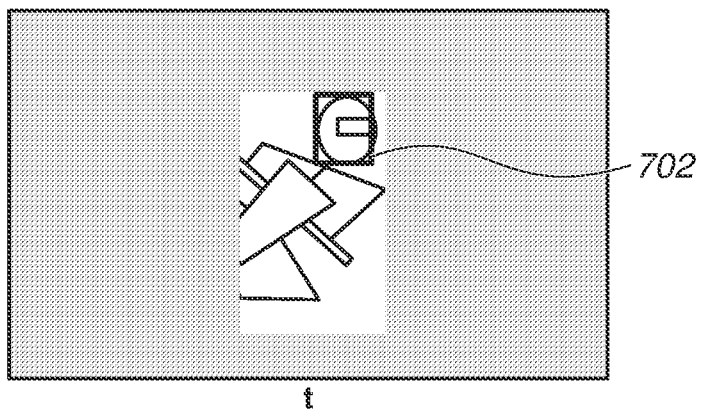

As with FIGS. 6A, 6B, and 6C, FIGS. 7A, 7B, and 7C are diagrams illustrating an example of a positional relationship between an entire area 701 and a local area 702 in a case where the entire area 701 is defined as the "entire vehicle body" of a motorcycle and the local area 702 is defined as the "helmet of a driver". FIGS. 7A to 7C illustrate a time series variation of captured image data. Moreover, FIG. 7C illustrates an example in which, since a part of the vehicle body is cut off, an entire area is not able to be detected. In a case where the entire area or local area of the subject has previously been detected at past times close to each other as illustrated in FIGS. 7A and 7B relative to FIG. 7C, there is a high possibility of the subject existing even in image data obtained at a next time. Additionally, calculating the amount of movement from the positional relationship between an entire area and a local area detected in a past frame in a specific subject stored in the detection history storage unit 203 and the sizes of the detected areas enables estimating a position at which there is a high possibility of a subject existing in image data illustrated in FIG. 7C. FIG. 7D illustrates an example of image data obtained by trimming the image data illustrated in FIG. 7C in such a manner that the local area has a predetermined size and falls within a predetermined position, based on the above-mentioned past detection history. Performing trimming of image data based on a past history as illustrated in FIG. 7D enables reducing the possibility of an object similar to the features of a subject existing in image data and generating image data able to be easily detected, thus increasing the detection performance.

The trimming range can be determined by predicting the next position of a subject based on the positional relationship between the entire area and the local area and the amounts of movement thereof detected in the past frames, as in the example illustrated in FIGS. 7A to 7C. Moreover, in consideration of a case where local area detection is not being performed at times close to each other or in consideration of the positional relationship between the entire area and the local area varying over time, the trimming range can be determined with use of only a detection result of the entire area. Additionally, for example, in a case where the subject is coming close to the imaging apparatus 100 as in the example illustrated in FIG. 6C, it can be considered that, depending on motions of the subject, if trimming is performed based on the positions of the entire area in the past frames, the local area may not fall within the image obtained by trimming. Therefore, the system control unit 50 checks a detection history about the past image data (first image data) stored in the detection history storage unit 203. As a result, when having determined that the entire area is not falling within the image data based on the transition of the positions or sizes of the entire area and the local area detected in pieces of image data at times close to each other, the system control unit 50 can perform local area detection without performing trimming.

Next, a switching sequence for a plurality of pieces of dictionary data with respect to one frame (one piece of image data) obtained by the imaging apparatus 100, which is performed in step S403 illustrated in FIG. 4, is described. In a case where a plurality of pieces of dictionary data is stored in the dictionary data storage unit 204, it is possible to perform detection with use of a plurality of pieces of dictionary data with respect to one frame. On the other hand, it can be considered that, in images in a live view mode in which sequentially captured images are output and processed or in moving image data obtained at the time of moving image recording, the number of times of subject detection is confined due to the issue of image capturing speed or processing speed.

At this time, the type or sequential order of dictionary data to be used can be determined depending on, for example, the presence or absence of any previously detected subject, the type of dictionary data used at that time, the type of a subject to be preferentially detected, or whether to perform local area detection. Depending on a switching sequence for dictionary data, when a specific subject is included in a frame, applicable dictionary data for subject detection may not be selected, so that an opportunity for detection may be lost. Therefore, it is necessary to also switch the switching sequence for dictionary data in conformity with the setting or scene.

As an example, in a structure capable of performing subject detection up to three times with respect to one frame (or a structure including three detectors capable of performing processing in parallel), an example of a dictionary data switching sequence to be performed in a case where a vehicle is selected as a subject to be preferentially detected is illustrated in each of FIGS. 8A, 8B, 8C, 8D, and 8E. Each of arrows V0 and V1 represents a vertical synchronization period for one frame, and blocks bounded by rectangles, such as those for "person's head", "vehicle 1 (motorcycle)", and "vehicle 2 (automobile)", indicate that it is possible to perform subject detection using three pieces of dictionary data (learned models) on a time-series basis within one vertical synchronization period.

FIG. 8A illustrates an example of a dictionary data switching sequence to be performed in a case where any subject already detected in one frame does not exist, and, in this example, pieces of dictionary data are switched in the order of the entire area of the person's head, the entire area of the vehicle 1 (motorcycle), and the entire area of the vehicle 2 (automobile). For example, in a case where no switching sequence is provided and dictionary data available for detecting a subject selected by the user via the menu screen such as that illustrated in FIG. 3A is always used, the user's trouble of switching the priority detection subject setting for each scene, such as setting a vehicle as a subject to be preferentially detected when a vehicle is shown in image data and setting a person as a subject to be preferentially detected when other than a vehicle is shown in image data, occurs. Moreover, in a case where at what moment a vehicle comes is uncertain, if the user switches the priority detection subject setting after becoming aware of a vehicle, it may become too late to perform image capturing. To address this issue, the present exemplary embodiment is configured to always detect the "person's head", which is a detection target easily serving as a subject, in a period in which no specific subject is being detected as illustrated in FIG. 8A and to switch pieces of dictionary data according to the priority detection subject setting in the other cases. This enables decreasing the number of times of switching of the priority detection subject setting.

FIG. 8B illustrates an example of a dictionary data switching sequence to be performed in a next frame in a case where a motorcycle has been detected in a preceding frame, and, in this example, pieces of dictionary data are switched in the order of the entire area of the vehicle 1 (motorcycle), the entire area of the person's head, and the local area of the vehicle 1 (motorcycle). With regard to switching of pieces of dictionary data, detection does not necessarily need to be performed in the above-mentioned order. For example, in the above-mentioned example of a dictionary data switching sequence, dictionary data for the entire area of the person's head can be switched in conformity with a scene, and, for example, in the case of a scene in which image capturing is performed on a motorcycle, can be switched to dictionary data via which a subject other than vehicles is easily selected. The example illustrated in FIG. 8B can be considered to be directed to a sequence to be performed in a case where setting of "vehicle priority" has been performed as an image capturing mode. Moreover, at this time, control not to perform detection using pieces of dictionary data for "animal" and "bird", which are not likely to be detected in parallel with a vehicle, and the local areas thereof can be performed. With this control, as a result, the detection accuracy for a desired subject is increased.

FIG. 8C illustrates an example of a dictionary data switching sequence to be performed in a case where a person's head has been detected in a preceding frame, and, in this example, pieces of dictionary data are switched in the order of the entire area of the person's head, the entire area of the vehicle 1 (motorcycle), and the person's eyes. Here, the person's eyes are a local area relative to the entire person's head. Performing detection of the entire area of the vehicle 1 (motorcycle) using the second dictionary data enables, even when detection of the local area of a person is being performed, detecting the entire area of a vehicle when a vehicle set as a priority detection subject has come into the frame.

As illustrated in FIGS. 8A to 8C, a plurality of types of dictionary data for entire area detection is used in combination until a subject is detected with any dictionary data from among a plurality of pieces of dictionary data stored in the dictionary data storage unit 204. After that, in a case where there is a high possibility of an entire area being detected, subjects to be detected are narrowed down and pieces of dictionary data for local area detection are used in combination, so that it becomes possible to increase a detection rate.

FIG. 8D illustrates an example of a dictionary data switching sequence to be performed in a case where subject detection is performed with a plurality of pieces of dictionary data for entire area detection being switched over two frames. The example illustrated in FIG. 8D is not an example of using the same dictionary data switching sequence for each frame such as the examples illustrated in FIGS. 8A, 8B, and 8C. For example, in a case where there is no history of past detection and setting of a subject to be preferentially detected is not performed, a dictionary data switching sequence covering a plurality of frames such as the example illustrated in FIG. 8D is used. Here, after an entire area is detected with any dictionary data, switching to a dictionary data switching sequence such as the example illustrated in FIG. 8A, 8B, or 8C can be performed.

Moreover, when the user has designated a some area in a live view image displayed on the display unit 28, to identify a subject from the designated area, a dictionary data switching sequence covering a plurality of frames such as the example illustrated in FIG. 8D can be used.

FIG. 8E illustrates an example of a dictionary data switching sequence to be performed in a case where OFF of local area detection is selected, and, in this sequence, only dictionary data for the entire area of the vehicle 1 (motorcycle) is used.

In a case where the user selects a vehicle as a subject to be preferentially detected and additionally selects OFF of local area detection, it can be assumed that a subject on which the user wants to perform image capturing is not a driver but a vehicle body. Dictionary data generated with machine learning may cause the possibility of erroneously detecting an object similar to a detection target as the detection target. The sequence is changed in such a way as to prevent performing only local area detection, based on a dictionary data switching sequence to be performed in a case where a vehicle is selected as a subject to be preferentially detected such as the example illustrated in FIG. 8B.

At this time, since a helmet has a shape similar to that of a person's head, dictionary data for the entire area of a person's head may cause the possibility of a helmet being detected as the entire area of a person's head. Narrowing down the types of dictionary data to be used depending on targets desired to be detected, as illustrated in FIG. 8E, enables preventing the detection accuracy from decreasing.

Thus far is the description of the case of detecting an entire area and a local area in a specific subject. Next, as a method of estimating an entire area and a local area of a subject, an exemplary embodiment including not only detection units for an entire area and a local area but also a tracking unit is described. While, as a technique for tracking a specific subject in an image, for example, techniques using luminance information or color information and template matching techniques exist, in recent years, a technique using a convolutional neural network (CNN) has been attracting attention as a high-precision tracking technique.

"Fully-Convolutional Siamese Networks for Object Tracking", arXiv 2016, is one of methods for tracking a specific subject in an image. This method inputs an image in which a tracking target is shown and an image which serves as a search range to respective CNNs having the same weight and calculates a mutual relationship between feature quantities obtained from the respective CNNs, thus identifying a position in which the tracking target exists in the image serving as a search range.

Tracking processing is assumed to be performed by the subject detection unit 202 illustrated in FIG. 2B, and the dictionary data storage unit 204 is assumed to store, separately from pieces of dictionary data for "person" and "vehicle", dictionary data for "tracking". Furthermore, "tracking" is assumed to be applicable to an optional subject, and the initial value of tracking is assumed to be a value that is based on a subject detection result obtained with dictionary data for "person" or "vehicle". The first one frame for tracking is registered in the detection history storage unit 203 with a feature quantity obtained from a CNN set as a template based on a detection area for subject detection. In the subsequent frames, a subject area is estimated by template matching from the registered template and the input image.

FIG. 9 is a flowchart illustrating processing obtained by adding tracking processing to the processing in the flowchart of FIG. 4. Steps in the present flowchart are performed by the system control unit 50 or are performed by the respective units in response to instructions issued by the system control unit 50, as with the flowchart of FIG. 4. At the start of the present flowchart, it is assumed that the imaging apparatus 100 is powered on and an image capturing mode for live view is ready to be performed in a state in which the user is able to issue an instruction to start image capturing (recording) of a still image or a moving image by performing an operation on the operation unit 70.

Step S901 to step S907 are similar to step S401 to step S407 and are, therefore, omitted from description. In step S904, the system control unit 50 determines whether dictionary data for entire area detection has been selected by the dictionary data selection unit 205 in step S903. If it is determined that the result of determination in step S904 is yes (YES in step S904), the system control unit 50 advances the processing to step S905, and, if it is determined that the result of determination in step S904 is no (NO in step S904), the system control unit 50 advances the processing to step S908. In step S908, the system control unit 50 determines whether dictionary data for tracking has been selected by the dictionary data selection unit 205. If it is determined that the result of determination in step S908 is yes (YES in step S908), the system control unit 50 advances the processing to step S909, and, if it is determined that the result of determination in step S908 is no (NO in step S908), the system control unit 50 advances the processing to step S910. Here, for tracking processing by the subject detection unit 202 in the present exemplary embodiment, a subject detection result obtained with dictionary data for "person" or "vehicle" is required. Accordingly, in a case where a detection result for an entire area in step S906 or a detection result for a local area in step S913 described below has not preliminarily been obtained, the dictionary data for tracking results in not being selected. In that case, until the entire area or local area of a subject is detected with dictionary data for "person" or "vehicle", a detection flow not using dictionary data for "tracking" is repeated.

In step S909, in response to the dictionary data for tracking being selected by the dictionary data selection unit 205, the subject detection unit 202 performs tracking processing. The subject detection unit 202 outputs, to the system control unit 50, information about, for example, the position, size, and reliability of a subject detected with use of the dictionary data for tracking stored in the dictionary data storage unit 204. At this time, the output of the subject detection unit 202, the type of the used dictionary data, the identifier of image data used for detection are then stored in the detection history storage unit 203. Additionally, at this time, the system control unit 50 can display, on the display unit 28, a part or the whole of the information which the subject detection unit 202 has output. Moreover, the system control unit 50 can change the above-mentioned display method depending on the used dictionary data.

Figure 10:
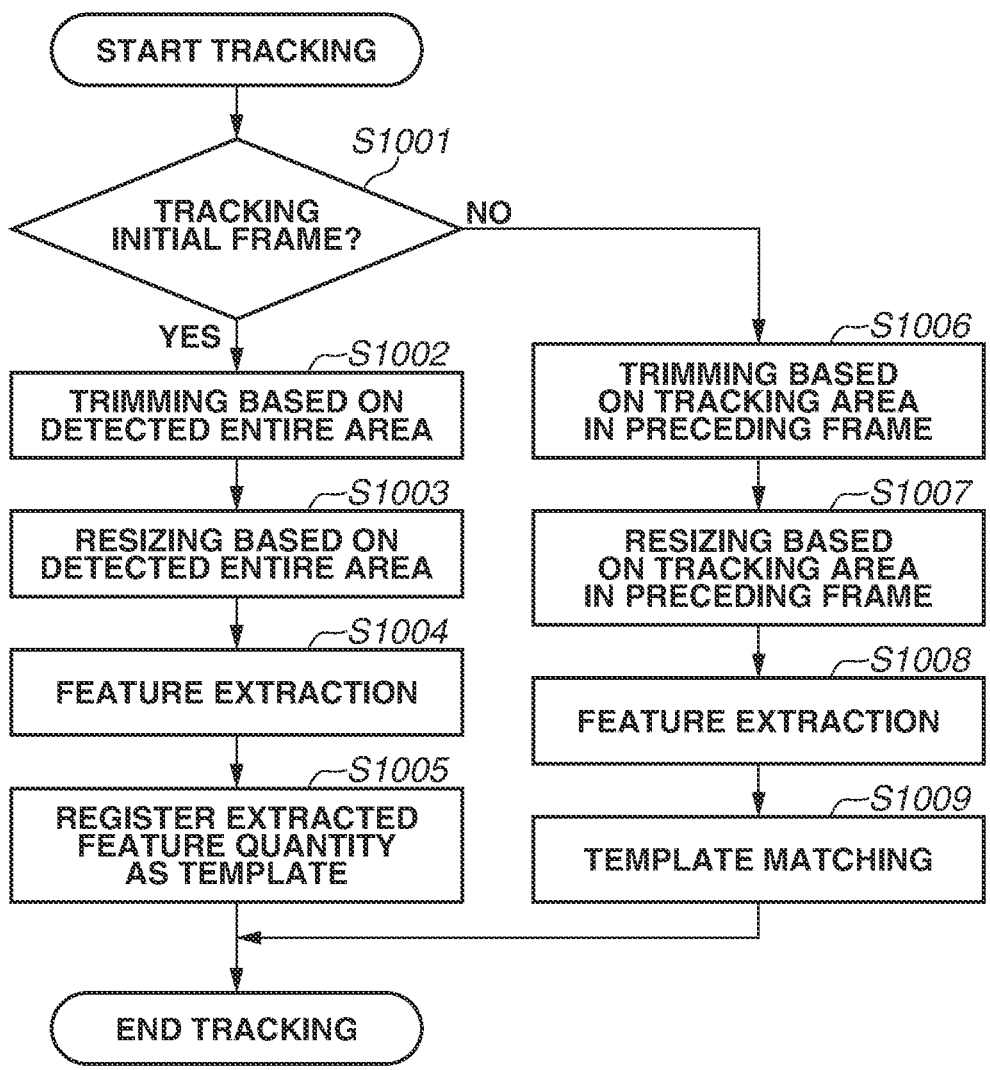
FIG. 10 is a flowchart illustrating the flow of tracking processing.

The flow of tracking processing which is performed in step S909 illustrated in FIG. 9 by the subject detection unit 202 is described with reference to FIG. 10.

In step S1001, the system control unit 50 determines whether the current frame is a tracking initial frame based on a subject detection history stored in the detection history storage unit 203. Here, the tracking initial frame refers to a frame obtained at a timing when a subject has appeared or a timing when subjects have switched. For example, the tracking initial frame corresponds to a frame in which the detection of the entire area or local area of a subject is newly successful with dictionary data for "person" or "vehicle". If it is determined that the current frame is a tracking initial frame (YES in step S1001), the system control unit 50 advances the processing to step S1002.

In step S1002, the image data generation unit 201 performs trimming processing on image data for tracking based on a detection result of the entire area or local area of image data having the same identifier (in the same frame) as image data to be subjected to tracking from now, stored in the detection history storage unit 203. Specifically, the image data generation unit 201 performs trimming in such a manner that the detected entire area or local area of a subject is trimmed into a predetermined size.

In step S1003, the image data generation unit 201 resizes the image data obtained by trimming in conformity with the input size for the subject detection unit 202, and then sends the resized image data to the subject detection unit 202.

In step S1004, the subject detection unit 202 performs feature extraction with a CNN. The CNN is preliminarily learned (trained) in such a manner that a feature quantity adapted for tracking is extracted, and, as dictionary data for tracking, the weight coefficients and operation parameters of the CNN are previously stored in the dictionary data storage unit 204. In step S1005, the subject detection unit 202 registers a partial area of the feature quantity extracted in step S1004 as a template with the detection history storage unit 203. In the case of a tracking initial frame, the tracking processing ends at this point.

If it is determined that the current frame is the second or subsequent frame (is not a tracking initial frame) (NO in step S1001), the system control unit 50 advances the processing to step S1006. In step S1006, the image data generation unit 201 performs trimming processing on image data for tracking based on a tracking area of the immediately preceding frame stored in the detection history storage unit 203. Here, as with the case of a tracking initial frame, the image data generation unit 201 performs trimming in such a manner that the tracking area is trimmed into a predetermined size. In step S1007, the image data generation unit 201 resizes the image data obtained by trimming in conformity with the input size for the subject detection unit 202, and then sends the resized image data to the subject detection unit 202.

In step S1008, the subject detection unit 202 performs feature extraction with a CNN on the image data subjected to trimming processing based on dictionary data for tracking stored in the dictionary data storage unit 204.

In step S1009, the subject detection unit 202 estimates a tracking area by performing a correlation calculation between the feature quantity extracted in step S1008 and the feature quantity of a template registered with the detection history storage unit 203. The subject detection unit 202 sets the estimated result as a tracking result and then ends the processing. In this tracking processing, since trimming is performed based on a subject area in step S1006, the size variation of a subject with time is reduced, so that the tracking performance is increased.

After the tracking processing in step S909 ends, the system control unit 50 advances the processing to step S907. In step S907, the system control unit 50 determines whether the subject detection unit 202 has performed detection with use of all of the pieces of dictionary data required with respect to image data having the same identifier (image data in the same frame) based on a detection history stored in the detection history storage unit 203. If it is determined that the result of determination in step S907 is yes (YES in step S907), the system control unit 50 ends the processing, and, if it is determined that the result of determination in step S907 is no (NO in step S907), the system control unit 50 returns the processing to step S903 to select dictionary data to be used next.

In step S910, the system control unit 50 determines whether a local area detection function is currently set to ON, and, if it is determined that the result of determination in step S910 is yes (YES in step S910), the system control unit 50 advances the processing to step S911, and, if it is determined that the result of determination in step S910 is no (NO in step S910), the system control unit 50 advances the processing to step S907.

In step S911, the system control unit 50 checks whether the detection result of the entire area or the tracking result exists in image data having the same identifier as that of image data to be subjected to detection from now based on a detection history stored in the detection history storage unit 203. If it is determined that the result of checking in step S911 is yes (YES in step S911), the system control unit 50 advances the processing to step S912, and, if it is determined that the result of checking in step S911 is no (NO in step S911), the system control unit 50 advances the processing to step S914. Furthermore, in the case of a state in which the reliability of entire area detection performed in step S906 is low or the reliability of tracking performed in step S909 is low, the system control unit 50 determines that there is no result of checking.

In step S912, the image data generation unit 201 performs trimming processing of image data for subject detection based on a detection result of the entire area or a tracking result of image data having the same identifier (in the same frame) as that of image data to be subjected to detection from now, stored in the detection history storage unit 203. Specifically, the image data generation unit 201 sets, as a trimming area, an area broader by a predetermined angle of view (a predetermined number of pixels) than the entire area of a subject from an area in which the entire area of the subject has been detected or the tracking area. How much broader to set a trimming area from the detected entire area or the tracking area can be set to a size or ratio which differs depending on a subject targeted for detection. In addition, in step S912, the image data generation unit 201 resizes image data subjected to trimming processing in conformity with an input size for the subject detection unit 202, and sends the trimmed and resized image data to the subject detection unit 202. Furthermore, in a case where both the detection result of the entire area and the tracking result exist, the image data generation unit 201 is assumed to preferentially use the detection result of the entire area.

In step S913, the subject detection unit 202 outputs, to the system control unit 50, information about, for example, the position, size, and reliability of a subject which the subject detection unit 202 has detected with use of dictionary data for local area detection stored in the dictionary data storage unit 204. At this time, the system control unit 50 then stores, in the detection history storage unit 203, the output of the subject detection unit 202, the type of the dictionary data used by the subject detection unit 202, and the identifier of image data used for detection. Additionally, at this time, the system control unit 50 can display, on the display unit 28, a part or the whole of the information which the subject detection unit 202 has output. Moreover, the system control unit 50 can change the above-mentioned display method depending on the used dictionary data.

Next, the system control unit 50 advances the processing to step S907. If, in step S907, it is determined that the detection of the entire area, the tracking, and the detection of the local area have been completed (YES in step S907), the system control unit 50 ends the processing.

Processing operations in step S914 to step S915 are similar to processing operations in step S412 to step S413 and are, therefore, omitted from description.

As compared with the flow of processing illustrated in FIG. 4, in the case of the flow of processing illustrated in FIG. 9, tracking processing for the entire area is additionally provided. This causes the performance for estimating the entire area to increase. Accordingly, the probability that the result of determination in step S910 is yes becomes higher. Thus, cases of not performing trimming and resizing based on a detection history of the past frame but performing trimming and resizing based on a detection or tracking result in the same frame increase. In a case where the subject is a moving body, performing image generation based on detection or tracking information in the same frame more increases the accuracy of local area detection than that in the past frame.

Next, a switching sequence for a plurality of pieces of dictionary data with respect to one frame (one piece of image data) obtained by the imaging apparatus 100, which is performed in step S903 illustrated in FIG. 9, is described. As an example, as with the description in FIGS. 8A to 8E, in a structure capable of performing subject detection up to three times with respect to one frame (or a structure including three detectors capable of performing processing in parallel), an example of a dictionary data switching sequence to be performed in a case where a vehicle is selected as a subject to be preferentially detected is illustrated in each of FIGS. 11A, 11B, 11C, 11D, 11E, and 11F. Unlike the dictionary data switching sequences illustrated in FIGS. 8A to 8E, blocks for tracking are additionally provided in the dictionary data switching sequences illustrated in FIGS. 11A to 11F. FIGS. 11A, 11C, and 11D are similar to FIGS. 8A, 8C, and 8D and are, therefore, omitted from description.

FIG. 11B illustrates an example of a dictionary data switching sequence to be performed in a next frame in a case where a motorcycle has been detected in a preceding frame, and, in this example, pieces of dictionary data are switched in the order of the entire area of the vehicle 1 (motorcycle), tracking, and the local area of the vehicle 1 (motorcycle). With regard to the tracking, in a tracking initial frame, template registration is performed based on the detected entire area of the vehicle 1 (motorcycle), and, in the second and subsequent frames, an area targeted for tracking is estimated by template matching. This provides two types of estimation units for the entire area of the vehicle 1 (motorcycle), i.e., subject detection and tracking, so that the detection rate increases.

FIG. 11E illustrates an example of a dictionary data switching sequence to be performed in a case where OFF of local area detection is selected, and, in this sequence, pieces of dictionary data are switched in the order of the entire area of the vehicle 1 (motorcycle) and tracking. In a case where the user selects a vehicle as a subject to be preferentially detected and additionally selects OFF of local area detection, it can be assumed that a subject on which the user wants to perform image capturing is not a driver but a vehicle body. Therefore, in the dictionary data switching sequence illustrated in FIG. 11E, tracking processing is additionally provided with respect to the dictionary data switching sequence illustrated in FIG. 8E, so that an increase in the detection rate of the entire area is expected.

Furthermore, while, in the above description, the method in which the subject detection unit 202 detects an object in a specific category, such as "motorcycle" or "person", and performs tracking based on the detected area has been described, there can be a method in which the subject detection unit 202 tracks an optional object which the user has designated.

With regard to object detection in a specific category, the detection of a target is implemented by learning targets in a specific category desired to be detected, such as "motorcycle" or "person". Dictionary data is provided for each specific category and the dictionary data selection unit 205 switches dictionary data to be used depending on a situation of image capturing, so that the detection of a specific subject is enabled. On the other hand, with regard to detection of an optional object, learning using information about objects in various categories is performed to enable simultaneously detecting objects in various categories without depending on categories of objects. In this object candidate detection, various categories are able to be addressed with one piece of dictionary data. However, while the object candidate detection is able to address objects in various categories, in a case where a plurality of areas seeming to be objects in an image has been detected, it is difficult to determine a single tracking target from among the plurality of areas. Therefore, as a resolution, a method of setting, as a tracking area, an object candidate area corresponding to the position designated by the user is described. The designation by the user can be input, for example, via the touch panel 70a of the imaging apparatus 100.

FIG. 11F illustrates an example of a dictionary data switching sequence to be performed in a case where the position input by the user has been performed.

The timing of the vertical synchronization period V0 illustrated in FIG. 11F is a timing at which the position designation by the user has been performed, and an example in which a target determined in the vertical synchronization period V0 is subjected to tracking processing in the vertical synchronization period V1 and subsequent vertical synchronization periods is illustrated. At the timing of the vertical synchronization period V0, in response to a trigger of the position input by the user occurring, the dictionary data selection unit 205 selects an object candidate dictionary stored in the dictionary data storage unit 204, and the subject detection unit 202 performs detection of an object candidate with use of the selected object candidate dictionary. Moreover, the subject detection unit 202 sets a detection object candidate close to the designated position as a tracking target. Next, the dictionary data selection unit 205 selects a tracking dictionary stored in the dictionary data storage unit 204, and the subject detection unit 202 performs template registration. In the vertical synchronization period V1 and subsequent vertical synchronization periods, the dictionary data selection unit 205 selects a tracking dictionary, and the subject detection unit 202 performs tracking processing based on the registered template. Switching of pieces of dictionary data to be performed in a case where the position input by the user has been performed is assumed to be performed in common regardless of setting of a subject to be detected. Moreover, since an object designated by the user is being tracked, automatic switching of tracking targets is made unnecessary, and subject detection using dictionary data for another specific subject is not performed.

The flow of processing in such a case is similar to that described with reference to FIG. 9. In step S903, in a case where the position input by the user has been performed, the dictionary data storage unit 204 selects an object candidate dictionary, in step S904, the result of determination becomes yes, and, in step S906, detection processing for an object candidate is performed with an image in the entire area.

Next, in step S907, the result of determination becomes no, and then in step S903, a tracking dictionary is selected. Next, in step S904, the result of determination becomes no, then in step S908, the result of determination becomes yes, and then in step S909, tracking processing is performed. Next, in step S907, the result of determination becomes yes, and the processing then ends. This flow of processing is a processing operation to be performed at the timing of the vertical synchronization period V0 illustrated in FIG. 11F. In processing operations for the vertical synchronization period V1 and subsequent vertical synchronization periods illustrated in FIG. 11F, the processing proceeds in the order of step S901, step S902, step S903, step S904, step S908, step S909, and step S907, and then ends.

Thus far is the description of a switching sequence for a plurality of pieces of dictionary data with respect to one frame (one piece of image data), which is performed by the imaging apparatus 100.

Each of the above-described exemplary embodiments is merely a representative example, and, in implementing the present disclosure, various modifications and alterations can be applied to each exemplary embodiment.

The present disclosure can also be implemented by performing processing for supplying a program for implementing one or more functions of the above-described exemplary embodiments to a system or apparatus via a network or a storage medium and causing one or more processors in a computer of the system or apparatus to read out and execute the program. Moreover, the present disclosure can also be implemented by a circuit which implements such one or more functions (for example, an application specific integrated circuit (ASIC)).

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-051873 filed Mar. 28, 2022, which is hereby incorporated by reference herein in its entirety.

What is claimed is:

1. An image processing apparatus comprising:
at least one processor and memory storing a program which causes the processor to:
acquire image data;
detect a first area of a subject from image data;
detect a second area of a subject from image data; and
track the subject,
wherein, when the first area from first image data is detected, the second area in an area corresponding to the first area is detected, and, in a case where the first area is detected in the first image data and the first area is not detected in second image data captured after the first image data, the second area in an area broader than the first area detected in the first image data is detected, and
wherein the subject is tracked with use of at least one of detection results obtained,
wherein amounts of movement of the first area and the second area is calculated with use of the first image data, generates image data by trimming an area in which the first area or the second area is predicted to exist in the second image data from image data acquired, and then performs detection of the second area.

2. The image processing apparatus according to claim 1, wherein a first learned model preliminarily subjected to machine learning and a second learned model preliminarily subjected to machine learning are used for the detecting the first area and detecting the second area, respectively.

3. The image processing apparatus according to claim 2, wherein the second learned model is a model learned in such a manner that an image having, as a background, a subject to be detected as the first area is set as an input image and positional information about the second area in the input image is set as an annotation.

4. The image processing apparatus according to claim 3, wherein the first learned model is a model learned in such a manner that an image including a subject to be detected as the first area and a background is set as an input image and positional information about the first area in the input image is set as an annotation.

5. The image processing apparatus according to claim 1, wherein tracking of the subject with use of a third learned model preliminarily subjected to machine learning.

6. The image processing apparatus according to claim 5, wherein the third learned model is a model learned in such a way as to cause a feature quantity adapted for tracking to be extracted.

7. The image processing apparatus according to claim 1, wherein the first area is broader than the second area.

8. The image processing apparatus according to claim 1, wherein the program further causes the processor to:
detect at least a partial area of a subject different from a subject which the first area and the second area detect;
set an image capturing mode; and
switch between detecting the first area, the second area, and the partial area according to the image capturing mode set.

9. The image processing apparatus according to claim 8, wherein each of the first area and the second area is an area corresponding to at least a part of a vehicle, and the second area is narrower than the first area.

10. The image processing apparatus according to claim 9,
wherein a third area corresponding to at least a part of a person is detected,
wherein a fourth area corresponding to at least a part of an animal different from persons is detected, and
wherein detection from image data from which the first area is detected is not detected.

11. The image processing apparatus according to claim 10, wherein, in a case where the third area is detected in the first image data and the third area is not detected in second image data captured after the first image data, in the second image data, the second area is detected from image data obtained by trimming with an area that is based on a position and size of the third area detected in the first image data.

12. The image processing apparatus according to claim 10, wherein, in a case where the first area and the third area are detected in the first image data and the first area is not detected in second image data captured after the first image data, in the second image data, the second area is detected from image data obtained by trimming with an area that is based on a position and size of the first area detected in the first image data.

13. The image processing apparatus according to claim 1, wherein, in a case where the first area is detected in the first image data and the first area is not detected in second image data captured after the first image data, in the second image data, the second area from image data obtained by trimming with an area that is based on a position and size of the first area detected in the first image data is detected.

14. The image processing apparatus according to claim 1, wherein, in a case where, in the first image data, the first area is not detected and the second area is detected, in the second image data, the second area in an area that is based on a position and size of the second area detected in the first image data is detected.

15. The image processing apparatus according to claim 1, wherein, in a case where at least one of the first area and the second area is detected in the first image data and it is determined that the first area does not fall within current image data, the second area without performing trimming from acquired image data is detected.

16. The image processing apparatus according to claim 1, wherein, in a case where the second area is detected in the first image data and the first area is detected in a detection result in the second image data, trimming is performed on the image data in such a manner that a relationship in size between the first area and the second area in the second image data becomes similar to a relationship in size between the first area and the second area in the first image data, and then detects the second area.

17. An image processing apparatus comprising:
at least one processor and memory storing a program which causes the processor to:
acquire image data;
detect a first area of a subject from image data;
detect a second area of a subject from image data; and
track the subject,
wherein, when the first area is detected from first image data, the second area is detected in an area corresponding to the first area, and, in a case where the first area is detected in the first image data and the first area is not detected in second image data captured after the first image data, the second area is detected in an area broader than the first area detected in the first image data, and
wherein the subject is tracked with use of at least one of detection results obtained,
wherein a plurality of pieces of image data including the first image data are compared with each other, and, in a case where it is determined that at least one of the first area and the second area is becoming larger as time proceeds, performs detection of the second area in the second image data.

18. An image processing apparatus comprising:
at least one processor and memory storing a program which causes the processor to:
acquire image data;
detect a first area of a subject from image data;
detect a second area of a subject from image data; and
track the subject,
wherein, when the first area is detected from first image data, the second area is detected in an area corresponding to the first area, and, in a case where the first area is detected in the first image data and the first area is not detected in second image data captured after the first image data, the second area is detected in an area broader than the first area detected in the first image data, and
wherein the subject is tracked with use of at least one of detection results obtained,
wherein a plurality of pieces of past image data including the first image data are compared with each other, estimates a relationship in size between the first area and the second area in a current image from transitions of sizes of the first area and the second area, performs trimming on image data acquired in such a manner that, in the second image data, the estimated relationship becomes similar to a relationship in size between the past first area and the past second area, and then detects the second area.

19. An image processing apparatus comprising:
at least one processor and memory storing a program which causes the processor to:
acquire image data;
detect a first area of a subject from image data;
detect a second area of a subject from image data; and
track the subject,
wherein, when the first area is detected from first image data, the second area is detected in an area corresponding to the first area, and, in a case where the first area is detected in the first image data and the first area is not detected in second image data captured after the first image data, the second area is detected in an area broader than the first area detected in the first image data, and
wherein the subject is tracked with use of at least one of detection results obtained,
wherein, even in a case where the first area is not detected in the second image data and the first area is detected in the first image data, if an amount of change of image data calculated from the first image data and the second image data has become greater than or equal to a given threshold value, detection of the second area is not performed.

20. The image processing apparatus according to claim 19, wherein a first learned model preliminarily subjected to machine learning and a second learned model preliminarily subjected to machine learning is used to detect the first area and the second area, respectively.

21. The image processing apparatus according to claim 20, wherein the second learned model is a model learned in such a manner that an image having, as a background, a subject to be detected as the first area is set as an input image and positional information about the second area in the input image is set as an annotation.

22. The image processing apparatus according to claim 21, wherein the first learned model is a model learned in such a manner that an image including a subject to be detected as the first area and a background is set as an input image and positional information about the first area in the input image is set as an annotation.

23. The image processing apparatus according to claim 19, wherein the subject is tracked with use of a third learned model preliminarily subjected to machine learning.

24. The image processing apparatus according to claim 23, wherein the third learned model is a model learned in such a way as to cause a feature quantity adapted for tracking to be extracted.

25. The image processing apparatus according to claim 19, wherein the first area is broader than the second area.

26. The image processing apparatus according to claim 19, wherein the program further causes the processor to:
   detect at least a partial area of a subject different from a subject which the first area and the second area are detected;
   set an image capturing mode; and
   switch between detecting the first area, the second area and the partial area according to the image capturing mode set.

27. The image processing apparatus according to claim 26, wherein each of the first area and the second area is an area corresponding to at least a part of a vehicle, and the second area is narrower than the first area.

28. The image processing apparatus according to claim 27,
   wherein a third area is detected corresponding to at least a part of a person,
   wherein a fourth area is detected corresponding to at least a part of an animal different from persons, and
   wherein detection from image data from which the first area is detected is not performed.

29. The image processing apparatus according to claim 28, wherein, in a case where the third area is detected in the first image data and the third area is not detected in second image data captured after the first image data, in the second image data, the second area is detected from image data obtained by trimming with an area that is based on a position and size of the third area detected in the first image data.

30. The image processing apparatus according to claim 28, wherein, in a case where the first area and the third area are detected in the first image data and the first area is not detected in second image data captured after the first image data, in the second image data, the second area is detected from image data obtained by trimming with an area that is based on a position and size of the first area detected in the first image data.

31. The image processing apparatus according to claim 19, wherein, in a case where the first area is detected in the first image data and the first area is not detected in second image data captured after the first image data, in the second image data, the second area is detected from image data obtained by trimming with an area that is based on a position and size of the first area detected in the first image data.

32. The image processing apparatus according to claim 19, wherein, in a case where, in the first image data, the first area is not detected and the second area is detected, in the second image data, the second area is detected in an area that is based on a position and size of the second area detected in the first image data.

33. The image processing apparatus according to claim 19, wherein, in a case where at least one of the first area and the second area is detected in the first image data and it is determined that the first area does not fall within current image data, the second area is detected without performing trimming from acquired image data.

34. The image processing apparatus according to claim 19, wherein, in a case where the second area is detected in the first image data and the first area is detected in a detection result in the second image data, the image data is trimmed in such a manner that a relationship in size between the first area and the second area in the second image data becomes similar to a relationship in size between the first area and the second area in the first image data, and then detects the second area.

35. An imaging apparatus comprising:
   an image sensor configured to capture a subject image formed via a lens unit; and
   at least one processor and memory storing a program which causes the processor to:
   acquire image data;
   detect a first area of a subject from image data;
   detect a second area of a subject from image data; and
   track the subject,
   wherein, when the first area is detected from first image data, the second area is detected in an area corresponding to the first area, and, in a case where the first area is detected in the first image data and the first area is not detected in second image data captured after the first image data, the second area is detected in an area broader than the first area detected in the first image data, and
   wherein the subject is tracked using at least one of detection results obtained,
   wherein amounts of movement of the first area and the second area are calculated with use of the first image data, generates image data by trimming an area in which the first area or the second area is predicted to exist in the second image data from image data acquired, and then performs detection of the second area.

36. A control method for an image processing apparatus, the control method comprising:
   acquiring image data;
   detecting a first area of a subject from image data;
   detecting a second area of a subject from image data; and
   tracking the subject,
   wherein, when the first area is being detected from first image data, detection of the second area is performed in an area corresponding to the first area, and, in a case where the first area is detected in the first image data and the first area is not detected in second image data captured after the first image data, detection of the second area is performed in an area broader than the first area detected in the first image data, and
   wherein tracking of the subject is performed with use of at least one of detection results obtained in the first area and the second area,
   wherein calculating amounts of movement of the first area and the second area with use of the first image data in which, generating image data by trimming an area in which the first area or the second area is predicted to exist in the second image data from image data, and then performing detection of the second area.

37. A non-transitory computer-readable storage medium storing computer-executable instructions that, when executed by a computer, cause the computer to perform a control method for an image processing apparatus, the control method comprising:

acquiring image data;

detecting a first area of a subject from image data;

detecting a second area of a subject from image data; and tracking the subject, wherein, when the first area is being detected from first image data, detection of the second area is performed in an area corresponding to the first area, and, in a case where the first area is detected in the first image data and the first area is not detected in second image data captured after the first image data, detection of the second area is performed in an area broader than the first area detected in the first image data, and wherein tracking of the subject is performed with use of at least one of detection results obtained in the first area and the second area, wherein calculating amounts of movement of the first area and the second area with use of the first image data in which, generating image data by trimming an area in which the first area or the second area is predicted to exist in the second image data from image data, and then performing detection of the second area.

* * * * *